United States Patent
Kobashi et al.

(10) Patent No.: US 11,687,085 B2
(45) Date of Patent: Jun. 27, 2023

(54) UNMANNED VEHICLE MANAGEMENT DEVICE, UNMANNED VEHICLE MANAGEMENT METHOD, AND MANAGEMENT SYSTEM

(71) Applicant: Komatsu Ltd., Tokyo (JP)

(72) Inventors: Yuji Kobashi, Tokyo (JP); Hiroshi Fuji, Tokyo (JP); Takashi Hiranaka, Tokyo (JP)

(73) Assignee: Komatsu Ltd., Tokyo (JP)

( * ) Notice: Subject to any disclaimer, the term of this patent is extended or adjusted under 35 U.S.C. 154(b) by 115 days.

(21) Appl. No.: 16/637,780

(22) PCT Filed: Dec. 7, 2018

(86) PCT No.: PCT/JP2018/045145
§ 371 (c)(1),
(2) Date: Feb. 10, 2020

(87) PCT Pub. No.: WO2019/150766
PCT Pub. Date: Aug. 8, 2019

(65) Prior Publication Data
US 2020/0249686 A1  Aug. 6, 2020

(30) Foreign Application Priority Data
Jan. 31, 2018  (JP) .............................. JP2018-015936

(51) Int. Cl.
*B60W 40/076* (2012.01)
*G05D 1/02* (2020.01)

(52) U.S. Cl.
CPC ......... *G05D 1/0223* (2013.01); *B60W 40/076* (2013.01); *B60W 2300/125* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,134,985 B2 | 11/2006 | Watanabe et al. | |
| 10,202,116 B2 | 2/2019 | Shiga et al. | |

(Continued)

FOREIGN PATENT DOCUMENTS

| | | | |
|---|---|---|---|
| JP | 2004-142690 A | 5/2004 | |
| JP | 2006-213294 A | 8/2006 | |

(Continued)

OTHER PUBLICATIONS

International Search Report dated Mar. 5, 2019, issued for PCT/JP2018/045145.
(Continued)

*Primary Examiner* — Jeff A Burke
*Assistant Examiner* — Zachary Joseph Wallace
(74) *Attorney, Agent, or Firm* — Locke Lord LLP

(57) ABSTRACT

An unmanned vehicle management device includes an upper limit speed storage unit that stores an upper limit of a traveling speed of an unmanned vehicle on a downhill set based on an inclination angle of the downhill, an input speed acquisition unit that acquires an input value input by an input device, and an output control unit that causes an output device to output upper limit speed data indicating a relationship between the inclination angle and the upper limit, and input speed data generated based on the input value.

6 Claims, 15 Drawing Sheets

(52) U.S. Cl.
CPC ..... *B60W 2520/10* (2013.01); *B60W 2552/15* (2020.02); *G05D 2201/0202* (2013.01)

(56) References Cited

U.S. PATENT DOCUMENTS

| | | |
|---|---|---|
| 2014/0156163 A1 | 6/2014 | Shin et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2015/0262091 A1 | 9/2015 | Yamagata et al. |
| 2017/0151946 A1 | 6/2017 | Shiga et al. |

FOREIGN PATENT DOCUMENTS

| | | |
|---|---|---|
| JP | 2007-323675 A | 12/2007 |
| WO | 2004/037623 A1 | 5/2004 |
| WO | 2014/045398 A1 | 3/2014 |
| WO | 2016/080555 A1 | 5/2016 |

OTHER PUBLICATIONS

Office Action dated Sep. 23, 2020, issued in the corresponding AU patent application No. 2018407034.

(A)

(B)

UNMANNED VEHICLE MANAGEMENT DEVICE, UNMANNED VEHICLE MANAGEMENT METHOD, AND MANAGEMENT SYSTEM

FIELD

The present invention relates to an unmanned vehicle management device, an unmanned vehicle management method, and a management system.

BACKGROUND

Unmanned vehicles may be used at wide-area work sites such as mines. An unmanned vehicle travels along a traveling path at a work site based on traveling condition data (see Patent Literature 1).

CITATION LIST

Patent Literature

Patent Literature 1: JP 2007-323675 A

SUMMARY

Technical Problem

Traveling path conditions are highly likely to vary depending on work sites or change with time, for example. Therefore, at some work sites, there is a demand to run an unmanned vehicle, for example, with a speed limit lower than an upper limit of a traveling speed set when the unmanned vehicle is shipped. Thus, there is a demand for a technique to enable flexible adjustment of a target traveling speed of an unmanned vehicle based on traveling path conditions at a work site.

An object of an embodiment of the present invention is to flexibly adjust a target traveling speed of an unmanned vehicle.

Solution to Problem

According to an aspect of the present invention, an unmanned vehicle management device comprises: an upper limit speed storage unit that stores an upper limit of a traveling speed of an unmanned vehicle on a downhill, set based on an inclination angle of the downhill; an input speed acquisition unit that acquires an input value input by an input device; and an output control unit that causes an output device to output upper limit speed data indicating a relationship between the inclination angle and the upper limit, and input speed data generated based on the input value.

Advantageous Effects of Invention

According to an embodiment of the present invention, a target traveling speed of an unmanned vehicle can be adjusted flexibly.

DESCRIPTION OF EMBODIMENTS

Hereinafter, embodiments according to the present invention will be described with reference to the drawings, but the present invention is not limited thereto. Components of the embodiments described below can be combined as appropriate. Some components may not be used.

Management Systems

Figure 1:
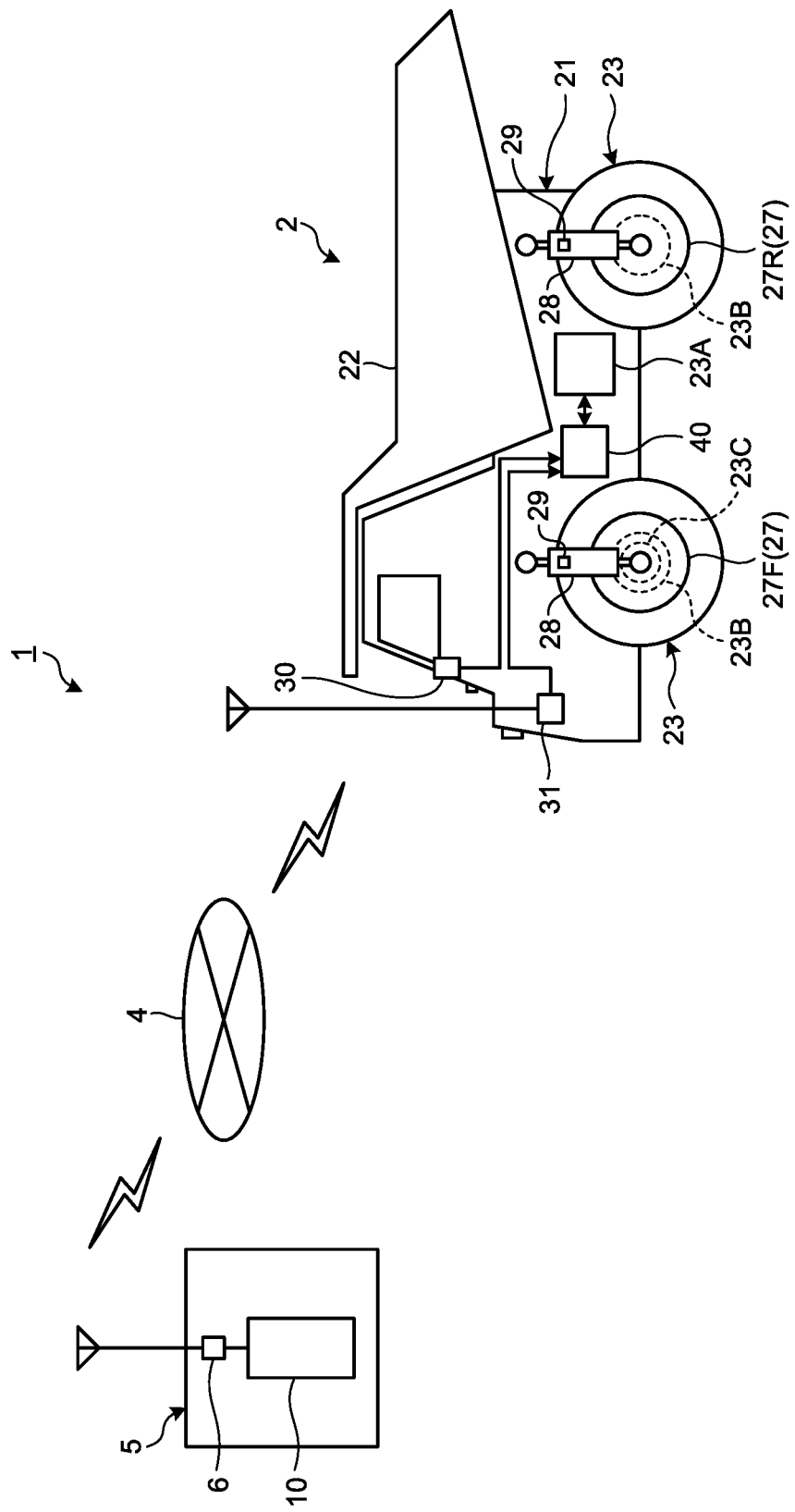
FIG. 1 is a diagram schematically illustrating an example of a management system and an unmanned vehicle according to the present embodiment.

FIG. 1 is a diagram schematically illustrating an example of a management system 1 and an unmanned vehicle 2 according to the present embodiment. The unmanned vehicle 2 refers to a vehicle that travels unattended without being driven by a driver. The unmanned vehicle 2 travels based on traveling condition data from the management system 1. The unmanned vehicle 2 may travel by remote control or travel autonomously. The unmanned vehicle 2 operates at a work site. In the present embodiment, the work site is a mine or a quarry. The unmanned vehicle 2 is a dump truck that travels at the work site to transport a cargo. A mine refers to a place or a business site to mine minerals. A quarry refers to a place or a business site to mine stones. Examples of cargoes transported on the unmanned vehicle 2 include ores or soil excavated in a mine or a quarry.

The management system 1 includes a management device 10 and a communication system A. The management device 10 includes a computer system and is installed in a control facility 5 at the work site. There is an administrator at the control facility 5. The communication system 4 communicates between the management device 10 and the unmanned vehicle 2. A wireless communication device 6 is connected to the management device 10. The communication system 4 includes the wireless communication device 6. The management device 10 and the unmanned vehicle 2 communicate wirelessly via the communication system 4. The unmanned vehicle 2 travels along a traveling path at the work site based on the traveling condition data transmitted from the management device 10.

Unmanned Vehicles

The unmanned vehicle 2 includes a vehicle main body 21, a dump body 22 supported by the vehicle main body 21, travel devices 23 supporting the vehicle main body 21, suspension cylinders 28 connected to the vehicle main body 21, weight sensors 29, a position detection device 30, a wireless communication device 31, and a control device 40.

The vehicle main body 21 includes a body frame and supports the dump body 22. The dump body 22 is a member onto which a cargo is loaded.

Each travel device 23 includes wheels 27 and travels along the traveling path. The wheels 27 include front wheels 27F and rear wheels 27R. Tires are attached to the wheels 27. The travel device 23 includes drive devices 23A, brake devices 23B, and steering devices 23C.

Each drive device 23A generates a driving force for accelerating the unmanned vehicle 2. The drive device 23A includes an internal combustion engine such as a diesel engine. The drive device 23A may include an electric motor The driving force generated by the drive device 23A is transmitted to the rear wheels 27R to be rotated. As the rear wheels 27R rotate, the unmanned vehicle 2 travels on its own.

Each brake device 23B generates a braking force for decelerating or stopping the unmanned vehicle 2.

The steering devices 23C can adjust a traveling direction of the unmanned vehicle 2. The traveling direction of the unmanned vehicle 2 includes a direction of a front section of the vehicle main body 21. The steering devices 23C adjust the traveling direction of the unmanned vehicle 2 by steering the front wheels 27F.

The suspension cylinders 28 alleviate an impact acting on the vehicle main body 21 from the traveling path via the travel device 23. The suspension cylinders 28 are disposed between the wheels 27 and the vehicle main body 21 A load due to weights of the vehicle main body 21 and the dump body 22 acts on the wheels 27 via the suspension cylinders 23.

The weight sensors 29 detect at least one of the weight of the dump body 22, presence/absence of a cargo loaded onto the dump body 22, and a weight of a cargo loaded onto the dump body 22. In the present embodiment, each of the weight sensors 29 includes a pressure sensor that detects a pressure of hydraulic oil in an internal space of each suspension cylinder 28.

The position detection device 30 detects a position of the unmanned vehicle 2. The position of the unmanned vehicle 2 is detected using a global navigation satellite system (GNSS). The global navigation satellite system includes a global positioning system (GPS). The global navigation satellite system detects an absolute position of the unmanned vehicle 2 specified by latitude, longitude, and altitude coordinate data. The position of the unmanned vehicle 2 specified in a global coordinate system is detected by the global navigation satellite system. The global coordinate system refers to a coordinate system fixed to the earth. The position detection device 30 includes a GPS receiver and detects the absolute position (coordinates) of the unmanned vehicle 2.

The wireless communication device 31 communicates wirelessly with the wireless communication device 6 connected to the management device 10. The communication system 4 includes the wireless communication device 31.

The control device 40 includes a computer system and is disposed in the vehicle main body 21. The control device 40 outputs operation commands including an accelerator command for operating the drive device 23A, a brake command for operating the brake device 23B, and a steering command for operating the steering devices 23C. The drive device 23A generates, based on the accelerator command output from the control device 40, the driving force for accelerating the unmanned vehicle 2. The brake device 23B generates, based on the brake command output from the control device 40, the braking force for decelerating or stopping the unmanned vehicle 2. Each steering device 23C generates, based on the steering command output from the control device 40, a swing force for changing a direction of the front wheels 27F in order to make the unmanned vehicle 2 go straight or swing.

Downhill Travel Control

Figure 2:
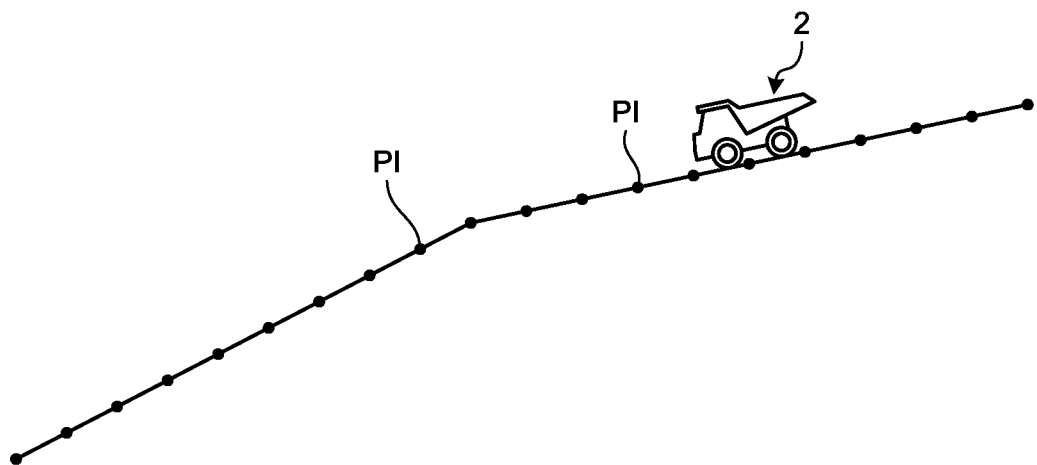
FIG. 2 is a diagram schematically illustrating the unmanned vehicle and a traveling path according to the present embodiment.

FIG. 2 is a diagram schematically illustrating the unmanned vehicle 2 and the traveling path according to the present embodiment. FIG. 2 illustrates an example of the unmanned vehicle 2 traveling along a downhill of the traveling path at the work site. The management device 10 sets traveling conditions of the unmanned vehicle 2 on the traveling path. The unmanned vehicle 2 travels along the traveling path based on the traveling condition data indicating the traveling conditions transmitted from the management device 10.

The traveling condition data include a target traveling speed and a target traveling route of the unmanned vehicle 2. As illustrated in FIG. 2, the traveling condition data include a plurality of points PI set at intervals on the traveling path. Each point PI indicates a target position of the unmanned vehicle 2 specified in a local coordinate system. A position of the point PI may be specified in the global, coordinate system.

In the present embodiment, a three-dimensional shape of the traveling path is acquired by a survey. Coordinate data of the traveling path in the local coordinate system are specified based on survey data of the traveling path. The three-dimensional shape of the traveling path may be measured by a three-dimensional measuring device mounted on a flying object such as a drone, and the coordinate data of the traveling path in the local coordinate system may be specified based on measurement data of the three-dimensional measuring device.

The points PI are specified along the traveling path. The target traveling speed is set for each of the points PI. The target traveling route is specified by a line connecting the points PI. Inclination angles of the downhill are specified by an altitude difference between adjacent points PI. The inclination angles of the downhill may be calculated based on traveling data of the unmanned vehicle 2.

The control device 40 of the unmanned vehicle 2 controls the travel device 23 based on detection data of the position detection device 30 so that the unmanned vehicle 2 travels according to the target traveling route. In other words, the control device 40 collates the detection data of the position detection device 30 with coordinate data of each point PI to control the travel device 23 so that a difference between the detection data of the position detection device 30 and the coordinate data of the point PI is equal to or less than an allowable value.

In the present embodiment, an upper limit of a traveling speed of the unmanned vehicle 2 on the downhill of the traveling path is set based on the inclination angle of the downhill. The upper limit of the traveling speed includes an allowable value of the traveling speed allowable for the unmanned vehicle 2. The upper limit of the traveling speed is determined based on performance of the unmanned vehicle 2 such as braking performance of the brake device 23B. In the present embodiment, as long as the upper limit of the traveling speed is not exceeded, the administrator of the control facility 5 can arbitrarily set the traveling speed of the unmanned vehicle 2 on the downhill.

Management Devices

Figure 3:
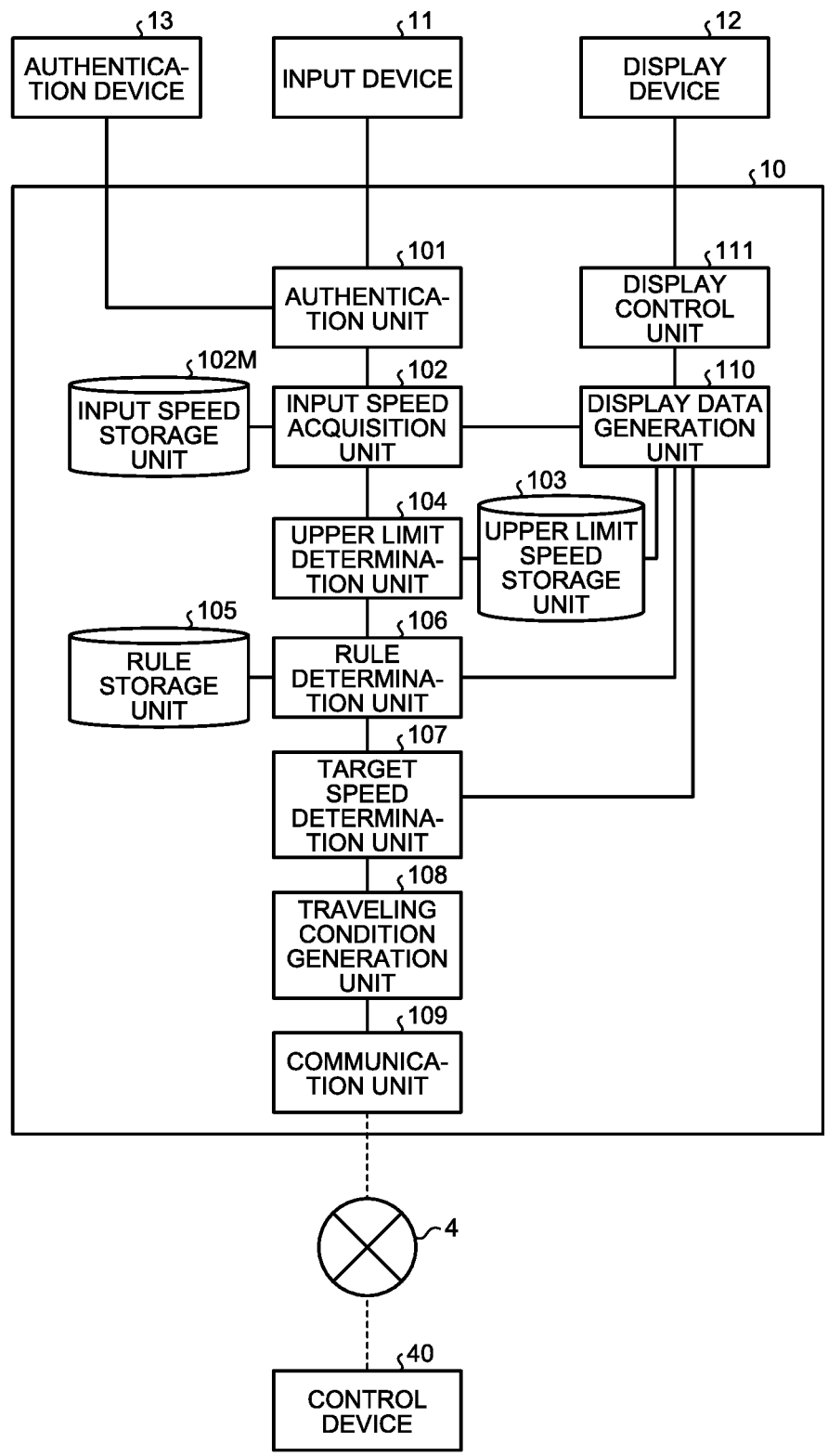
FIG. 3 is a functional block diagram illustrating a management device according to the present embodiment.

FIG. 3 is a functional block diagram illustrating the management device 10 according to the present embodiment. The management device 10 can communicate with the control device 40 via the communication system 4.

The management device 10 is connected to an input device 11, a display device 12, and an authentication device 13, respectively. The input device 11, the display device 12, and the authentication device 13 are disposed in the control facility 5.

The input device 11 is operated by the administrator of the control facility 5 to generate input data. The input data generated by the input device 11 are output to the management device 10. The management device 10 acquires the input data from the input device 11. Examples of the input device 11 include a contact input device operated by the administrator's hand, such as a computer keyboard, a mouse, a touch panel, an operation switch, and an operation button. The input device 11 may be a voice input device operated by a voice of the administrator.

The display device 12 has a display screen that displays display data. Examples of the display device 12 include a flat panel display such as a liquid crystal display (LCD) or an organic electroluminescence display (OELD). The administrator of the control facility 5 can view the display data displayed on the display device 12. The display device 12 functions as an output device that outputs the display data.

The authentication device 13 authenticates an administrator who operates the input device 11. Only the administrator authenticated by the authentication device 13 can operate the input device 11. The authentication device 13 acquires authentication data for authenticating the administrator. As the authentication data input to the authentication device 13, at least one of fingerprint data, face data, a user name, and a password is exemplified.

The management device 10 includes an authentication unit 101, an input speed acquisition unit 102, an input speed storage unit 102M, an upper limit speed storage unit 103, an upper limit determination unit 104, a rule storage unit 105, a rule determination unit 106, a target speed determination unit 107, a traveling condition generation unit 106, a communication unit 109, a display data generation unit 110, and a display control unit 111.

The authentication unit 101 authenticates the authentication data input by the authentication device 13. The authentication unit 101 collates the authentication data input by the authentication device 13 with registered data registered in advance to authenticate an administrator. When the authentication device 13 is a fingerprint authentication device, the authentication unit 101 collates fingerprint data input by the fingerprint authentication device with registered fingerprint data to authenticate an administrator. When the authentication device 13 is a face authentication device, the authentication unit 101 collates face data input by the face authentication device with registered face data to authenticate an administrator. When authentication data are a user name or a password, the authentication unit 101 collates the user name or the password input by the authentication device 13 with a user name or a password registered to authenticate an administrator.

The input speed acquisition unit 102 acquires the input data generated by the input device 11. As described above, in the present embodiment, only the administrator authenticated by the authentication device 13 can operate the input device 11. The input speed acquisition unit 102 acquires the input data input after the authentication by the authentication unit 101, that is, after the authentication unit 101 authenticates the administrator, the input speed acquisition unit 102 acquires the input data. On the other hand, when the authentication unit 101 does not authenticate an administrator, the input speed acquisition unit 102 rejects acquisition of the input data.

In the present embodiment, the administrator can operate the input device 11 to set the traveling speed of the unmanned vehicle 2 traveling on the downhill of the traveling path. The input speed acquisition unit 102 acquires, as the input data, input values of the traveling speeds of the unmanned vehicle 2 on the downhill, input for the inclination angles of the downhill by the input device 11. The input speed acquisition unit 102 acquires the input values of the traveling speeds input after the authentication by the authentication unit 101. When the administrator operates the input device 11, the management device 10 sets the traveling speed of the unmanned vehicle 2 for the inclination angle set for each of the points PI. The administrator may operate the input device 11 to input the traveling speed of the unmanned vehicle 2 for each of the points PI.

The input speed storage unit 102M stores the input values of the traveling speeds of the unmanned vehicle 2 acquired by the input speed acquisition unit 102. The input speed storage unit 102M stores the inclination angles of the downhill and the input values of the traveling speeds input for the inclination angles of the downhill in association with each other.

The upper limit speed storage unit 103 stores the upper limits of the traveling speeds of the unmanned vehicle 2 on the downhill, set based on the inclination angles of the downhill of the traveling path. The upper limit of the traveling speed is determined based on performance of the unmanned vehicle 2 such as braking performance of the brake device 23B. The upper limits of the traveling speeds of the unmanned vehicle 2 on the downhill, are stored in the upper limit speed storage unit 103 based on specifications of the unmanned vehicle 2 when the unmanned vehicle 2 is shipped, for example.

The upper limit determination unit 104 determines whether the input values of the traveling speeds acquired by the input speed acquisition unit 102 are equal to or less than the upper limits of the traveling speeds stored in the upper limit speed storage unit 103.

The rule storage unit 105 stores rules specified for the input values of the traveling speeds input by the input device 11. The administrator can operate the input device 11 to input the traveling speeds of the unmanned vehicle 2 on the downhill. The rules include a first rule indicating that the input value of the traveling speed input for each of a plurality of inclination angles on the downhill is in descending order of decreasing as the inclination angle increases. Further, the rules include a second rule indicating that a difference between the input values of the traveling speeds input for each of adjacent inclination angles among the inclination angles specified at a constant interval is equal to or less than a threshold specified in advance.

Figure 6:
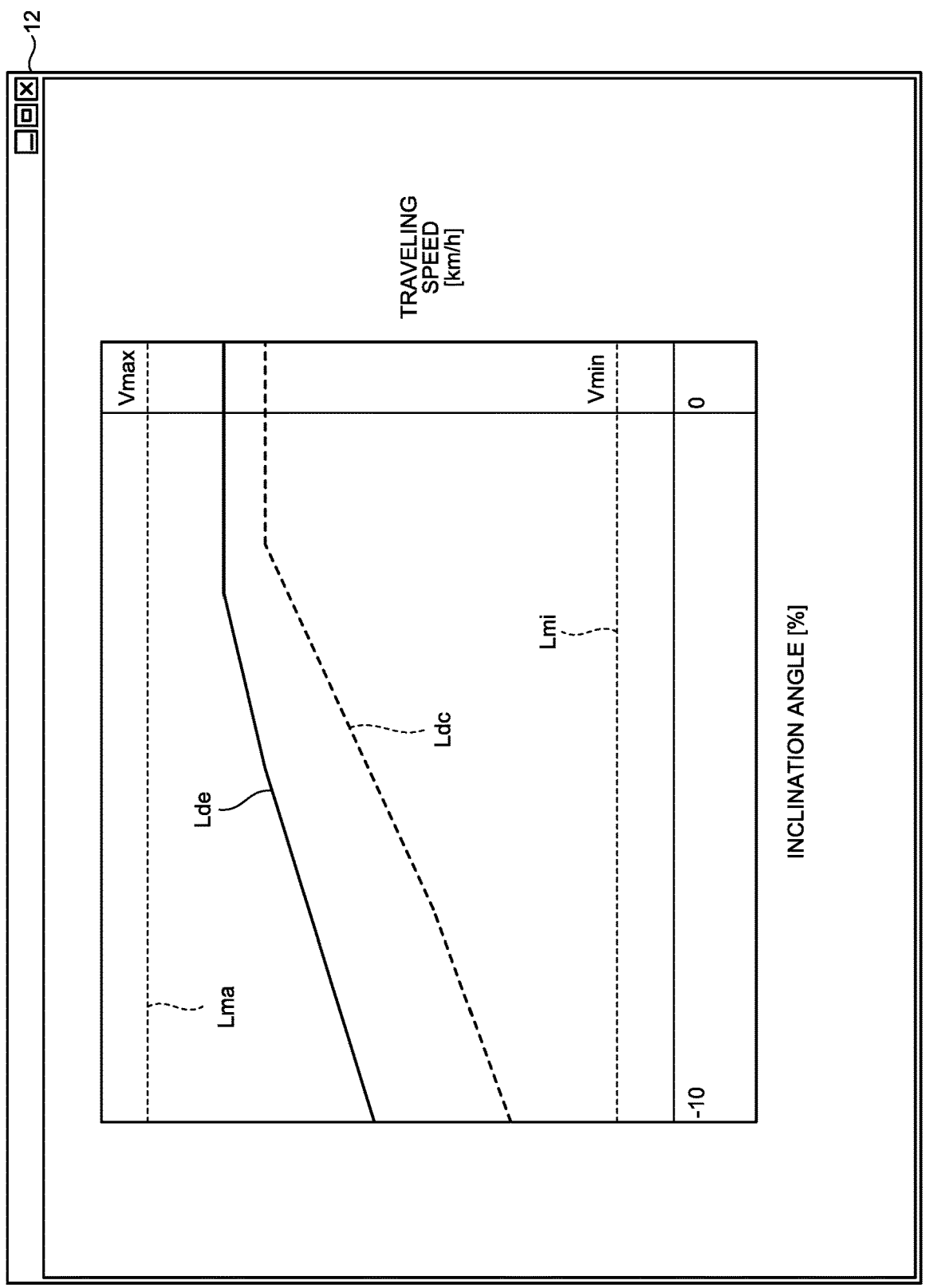
FIG. 6 is a view schematically illustrating an example of display data displayed on a display device according to the present embodiment.

Further, as illustrated in FIG. 6 described later, in the present embodiment, a maximum traveling speed value Vmax and a minimum traveling speed value Vmin are specified. The maximum traveling speed value Vmax is larger than the upper limit of the traveling speed. The minimum traveling speed value Vmin is a value larger than zero. The rules include a third rule indicating that the input values of the traveling speeds are smaller than the maximum value Vmax and a fourth rule indicating that the input values of the traveling speeds are larger than the minimum value Vmin.

The maximum traveling speed value Vmax and the minimum traveling speed value Vmin are values set for safe operation of the unmanned vehicle 2. The maximum value Vmax is a maximum traveling speed determined based on body performance of the unmanned vehicle 2. The unmanned vehicle 2 cannot travel at a traveling speed equal to or higher than the maximum value Vmax. The minimum value Vmin is a minimum traveling speed required for controlling the unmanned vehicle 2.

The rules may be only the first rule, only the second rule, only the third rule, or only the fourth rule. Further, the rules are not limited to the first rule, the second rule, the third rule, and the fourth rule and may be rules for appropriately setting the traveling speeds of the unmanned vehicle 2. The rules are specified in advance and stored in the rule storage unit 105 when the unmanned vehicle 2 is shipped, for example.

The rule determination unit 106 determines whether the input values of the traveling speeds input by the input device 11 violate the rules stored in the rule storage unit 105.

Based on the upper limits of the traveling speeds stored in the upper limit speed storage unit 103 and the input values of the traveling speeds determined as equal to or less than the upper limits by the upper limit determination unit 104, the target speed determination unit 107 determines target values of the traveling speeds of the unmanned vehicle 2 on the downhill.

In the present embodiment, the administrator of the control facility 5 can operate the input device 11 to arbitrarily set the traveling speeds of the unmanned vehicle 2 on the downhill. The target speed determination unit 107 compares the upper limit of the traveling speed with the input value of the traveling speed to determine the smaller value of the upper limit and the input value as the target value at the inclination angle.

The traveling condition generation unit 108 generates, based on the target values of the traveling speeds determined by the target speed determination unit 107, the traveling condition data indicating the traveling conditions of the unmanned vehicle 2. The target value of the traveling speed is set for each of the points PI. The traveling condition generation unit 103 generates the traveling condition data including the target traveling speed and the target traveling route of the unmanned vehicle 2. The traveling condition data include target speed data indicating a relationship between the inclination angles of the downhill and the target values of the traveling speeds of the unmanned vehicle 2 set on the downhill.

The communication unit 109 transmits the traveling condition data including the target speed data to the unmanned vehicle 2. The control device 40 of the unmanned vehicle 2 acquires the traveling condition data transmitted from the communication unit 109 via the communication system 4.

The display data generation unit 110 generates, based on the upper limits of the traveling speeds stored in the upper limit speed storage unit 103 and the input values of the traveling speeds acquired by the input speed acquisition unit 102, display data to be displayed on the display device 12.

The display data include upper limit speed data indicating a relationship between the inclination angles of the downhill and the upper limits of the traveling speeds and input speed data generated based on the input values of the traveling speeds. In the present embodiment, the display data include the upper limit speed data indicating the relationship between the inclination angles of the downhill and the upper limits of the traveling speeds and the input speed data indicating a relationship between the inclination angles of the downhill and the input values of the traveling speeds.

In the present embodiment, the display data include the target speed data indicating a relationship between the inclination angles of the downhill and the target values of the traveling speeds.

Furthermore, in the present embodiment, the display data include warning data when the rule determination unit 106 determines that the input values of the traveling speeds violate the rules.

The display control unit 111 controls the display device 12 to cause the display device 12 to display the display data generated by the display data generation unit 110. The display control unit 111 functions as an output control unit that causes the display device 12 to output the display data.

In the present embodiment, the display control unit 111 causes the display device 12 to display side by side the upper limit speed data and the input speed data. The upper limit speed data indicate the relationship between the inclination angles of the downhill and the upper limits of the traveling speeds. The input speed data indicate the relationship between the inclination angles of the downhill and the input values of the traveling speeds.

Further, the display control unit 111 causes the display device 12 to display the target speed data indicating the relationship between the inclination angles of the downhill and the target values of the traveling speeds. The display control unit 111 causes the display device 12 to display side toy side the upper limit speed data, the input speed data, and the target speed data.

Figure 12:
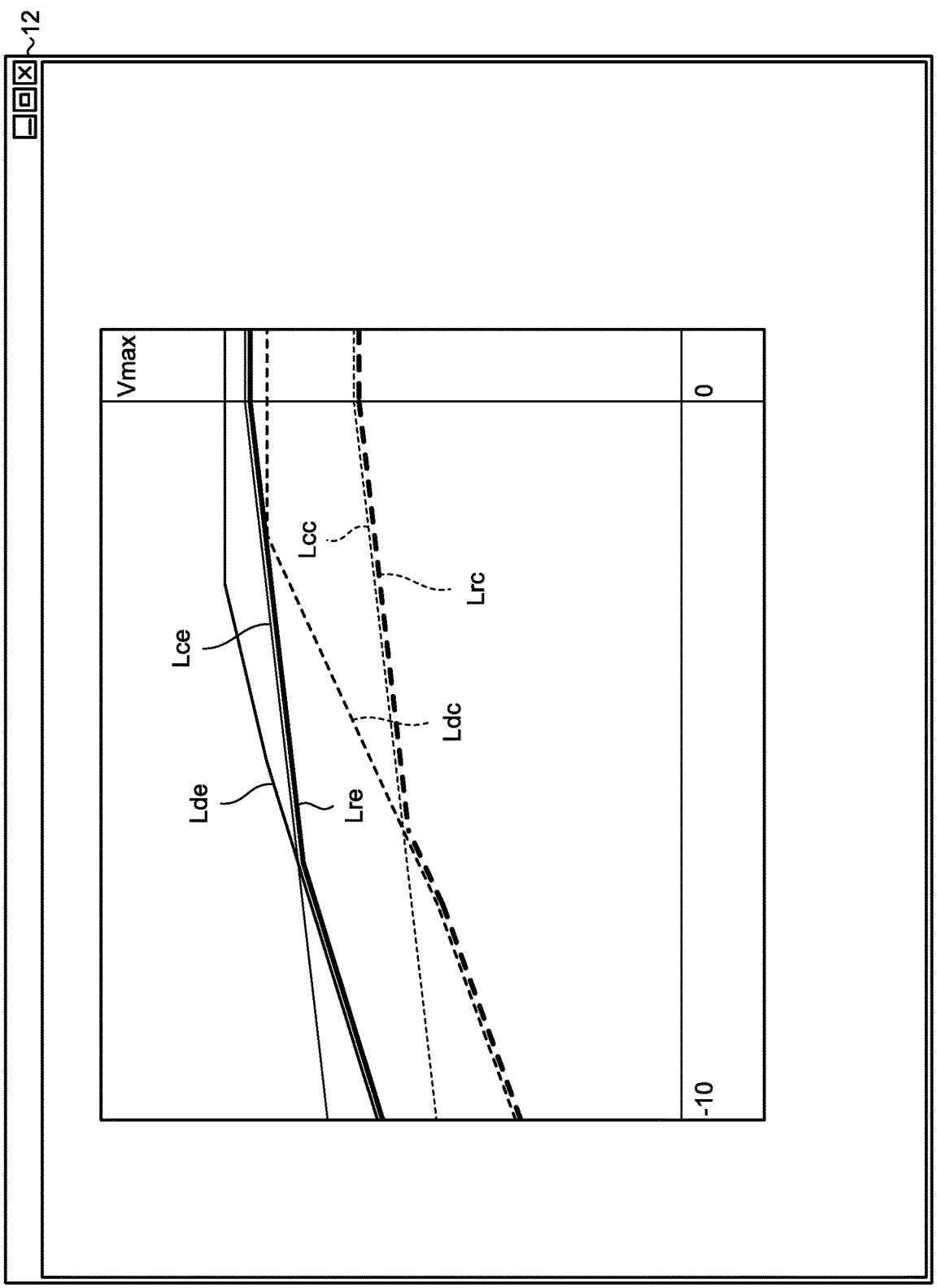
FIG. 12 is a view schematically illustrating an example of display data displayed on the display device according to the present embodiment.

The upper limit speed data, the input speed data, and the target speed data are represented in a graphical form in which a horizontal axis is an inclination angle and a vertical axis is a traveling speed, for example. The display control unit 111 can, as illustrated in FIG. 6 described later, cause the display device 12 to display side by side two lines indicating the upper limit speed data and the input speed data. In addition, the display control unit 111 can, as illustrated in FIG. 12 described later, cause the display device 12 to display side by side three lines indicating the upper limit speed data, the input speed data, and the target speed data.

The display control unit 111 causes the display device 12 to display warning data when the rule determination unit 106 determines that the input values of the traveling speeds violate the rules.

Control Devices

Figure 4:
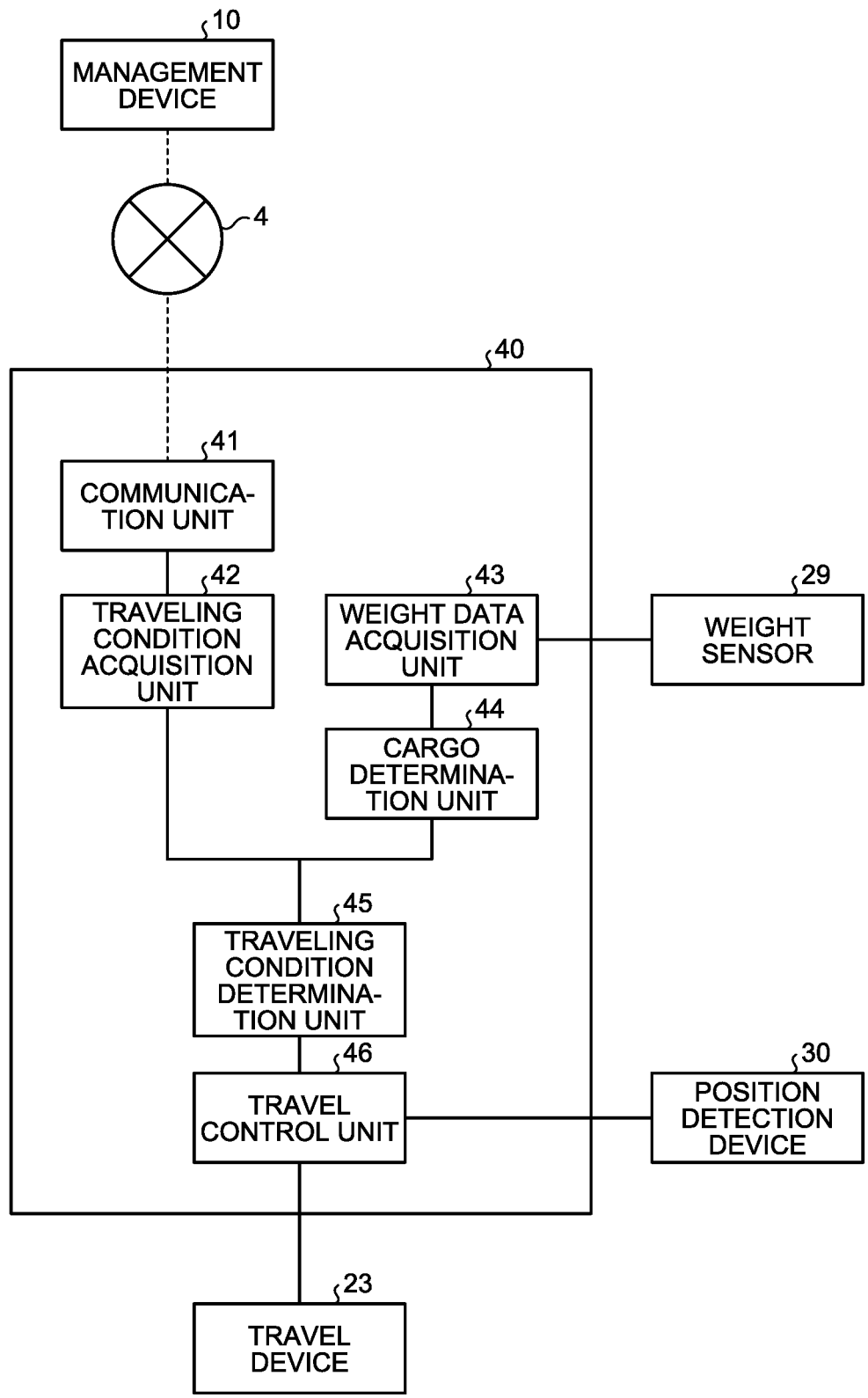
FIG. 4 is a functional block diagram illustrating a control device of the unmanned vehicle according to the present embodiment.

FIG. 4 is a functional block diagram illustrating the control device 40 of the unmanned vehicle 2 according to the present embodiment. The control device 40 can communicate with the management device 10 via the communication system 4.

The control device 40 includes a communication unit 41, a traveling condition acquisition unit 42, a weight data acquisition unit 43, a cargo determination unit 44, a traveling condition determination unit 45, and a travel control unit 46.

The traveling condition acquisition unit 42 acquires the traveling condition data transmitted from the management device 10 via the communication unit 41.

The weight data acquisition unit 43 acquires weight data detected by the weight sensor 29. The weight data detected by the weight sensor 29 include weight data of the dump body 22 and weight data of a cargo loaded on the dump body 22.

The cargo determination unit 44 determines, based on the weight data acquired by the weight data acquisition unit 43, whether the dump body 22 is loaded with a cargo. More specifically, the cargo determination unit 44 determines, based on the weight data, whether the dump body 22 is in a loaded state with a cargo loaded or in an unloaded state with no cargo loaded.

The traveling condition determination unit 45 determines the traveling conditions of the unmanned vehicle 2 based on the traveling condition data acquired by the traveling condition acquisition unit 42 and determination data by the cargo determination unit 44. In the present embodiment, the management device 10 generates the traveling condition data in a loaded state and the traveling condition data in an unloaded state and transmits the generated data to the control device 40. The traveling condition determination unit 45 selects, based on the determination data by the cargo determination unit 44, the traveling condition data in a loaded state or the traveling condition data in an unloaded state acquired by the traveling condition acquisition unit 42 and determines the selected traveling condition data as the traveling condition data to be output to the travel control unit 46.

The management device 10 may determine whether the unmanned vehicle 2 is in a loaded state or in an unloaded state and transmit the traveling condition data in a loaded state to the unmanned vehicle 2 determined as in a loaded state with a cargo and the traveling condition data in an unloaded state to the unmanned vehicle 2 determined as in an unloaded state.

The travel control unit 46 controls the travel device 23 based on the traveling condition data determined by the traveling condition determination unit 45. The travel control unit 46 controls, based on the detection data of the position detection device 30, the travel device 23 so that the unmanned vehicle 2 travels according to the target traveling route specified by the points PI.

Management Methods

Figure 5:
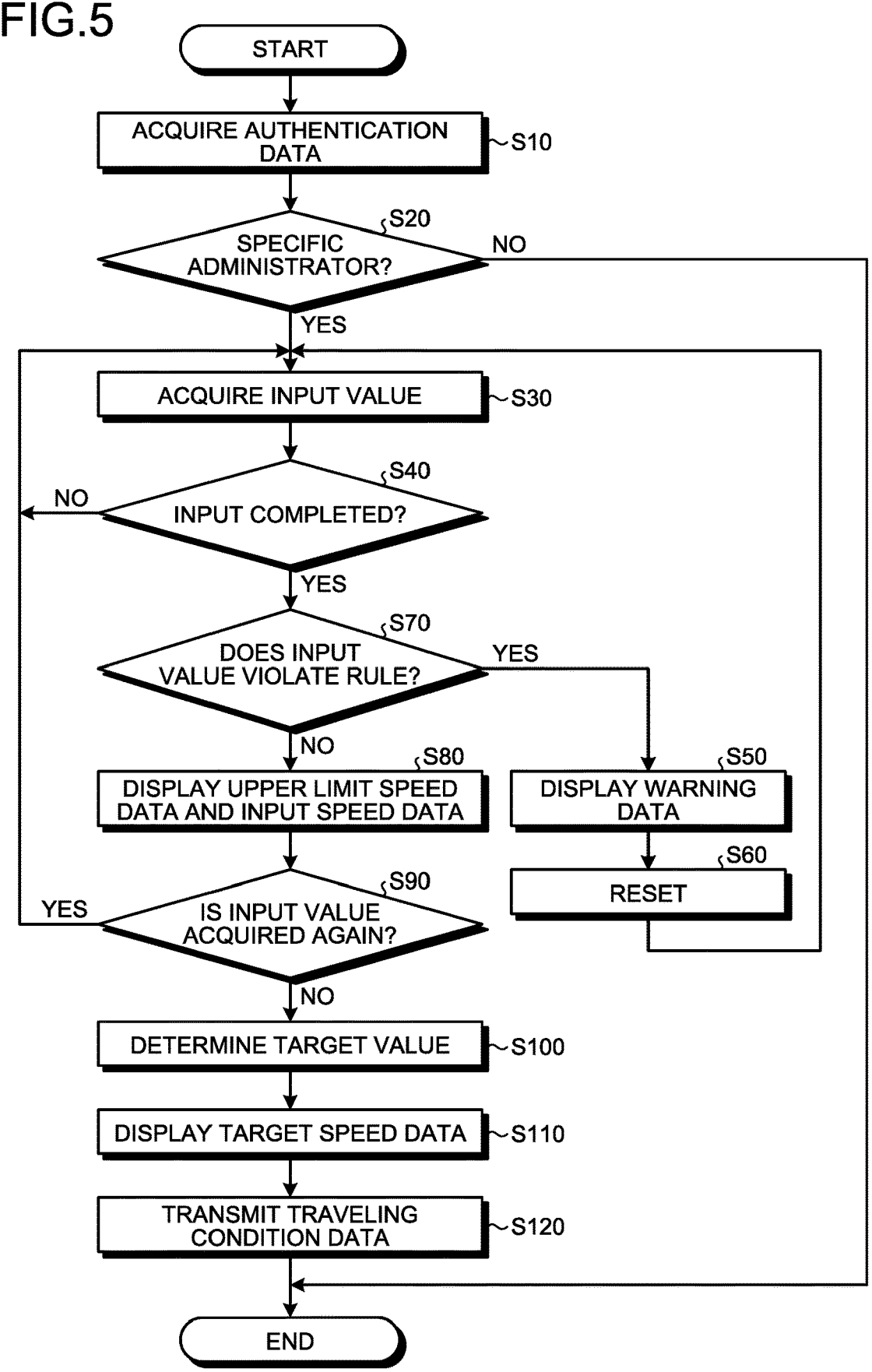
FIG. 5 is a flowchart illustrating a management method by the management device according to the present embodiment.

FIG. 5 is a flowchart illustrating an example of a management method by the management device 10 according to the present embodiment.

The administrator inputs the authentication data to the authentication device 13. The authentication device 13 outputs the input authentication data to the management device 10. The authentication unit 101 of the management device 10 acquires the authentication data (Step S10).

The authentication unit 101 collates the authentication data with registered data to determine whether the administrator who has input the authentication data to the authentication device 13 is a specific administrator permitted to operate the input device 11 (Step 320).

In Step S20, when it is determined that the administrator is not a specific administrator (Step S20: No), the processing ends. In Step S20, when it is determined that the administrator is a specific administrator (Step S20: Yes), the administrator is permitted to operate the input device 11.

When the operation of the input device 11 is permitted, the display control unit 111 causes the-display device 12 to display a menu selection screen. The administrator operates the input device 11 to select a specific menu from among menus displayed on the menu selection screen and thereby can cause the display device 12 to display the display data corresponding to the selected menu.

FIG. 6 is a view schematically illustrating an example of the display data displayed on the display device 12 according to the present embodiment. When the operation of the input device 11 is permitted and the specific menu is selected based on the menu selection screen, the display control unit 111 causes the display device 12 to display the upper limits of the traveling speeds stored in the upper limit speed storage unit 103.

In a graph illustrated in FIG. 6, a vertical axis represents the upper limits of the traveling speeds, and a horizontal axis represents the inclination angles of the downhill. In the present embodiment, the inclination angle is expressed in [%], and the traveling speed is expressed in [km/h]. For example, the inclination angle that descends 10 [m] when moving forward 100 [m] in a horizontal direction is −10 [%]. The inclination angle may be expressed in [°], and the traveling speed may be expressed in [mph].

In the present embodiment, the upper limit speed storage unit 103 stores two types of upper limit speed data indicating the relationship between the inclination angles of the downhill and the upper limits of the traveling speeds. In FIG. 6, a line Lde indicates the upper limit speed data in an unloaded state, and a line Ldc indicates the upper limit speed data in a loaded state. In descriptions below, the upper limit speed data in an unloaded state are appropriately referred to as empty upper limit speed data Lde, and the upper limit speed data in a loaded state are appropriately referred to as cargo upper limit speed data Ldc. When the empty upper limit speed data Lde and the cargo upper limit speed data Ldc are not distinguished, the empty upper limit speed data Lde and the cargo upper limit speed data Ldc are collectively referred to as upper limit speed data Ld as appropriate.

As illustrated in FIG. 6, at a certain inclination angle, the empty upper limit speed data Lde are higher than the cargo upper limit speed data Ldc. In other words, the unmanned vehicle 2 in an unloaded state is allowed to travel at a higher speed than the unmanned vehicle 2 in a loaded state. When the unmanned vehicle 2 in an unloaded state and the unmanned vehicle 2 in a loaded state travel under identical conditions and brake under identical conditions, a braking distance of the unmanned vehicle 2 in an unloaded state is shorter than a braking distance of the unmanned vehicle 2 in a loaded state. Therefore, the unmanned vehicle 2 in an unloaded state is allowed to travel at a higher speed than the unmanned vehicle 2 in a loaded state.

Further, as illustrated in FIG. 6, the upper limit of the traveling speed of the unmanned vehicle 2 decreases as the inclination angle of the downhill increases. More specifically, the upper limits of the traveling speeds of the unmanned vehicle 2 are set for the unmanned vehicle 2 to travel at a slower speed on the downhill with a sharper inclination.

In the present embodiment, the administrator of the control facility 5 can operate the input device 11 to arbitrarily set the traveling speeds of the unmanned vehicle 2 on the downhill. After the operation of the input device 11 is permitted and the upper limit speed data Ld are displayed on the display device 12, the display control unit 111 causes the display device 12 to display the display data prompting input of the traveling speeds. The administrator operates the input device 11 to input the traveling speeds of. the unmanned vehicle 2 on the downhill.

As described above, the upper limits of the traveling speeds are determined based on the performance of the unmanned vehicle 2 such as the braking performance of the brake device 23B. As illustrated in FIG. 6, in the present embodiment, the maximum traveling speed value Vmax indicated by a line Lma and the minimum traveling speed value Vmin indicated by a line Lmi are specified. The maximum traveling speed value Vmax is a value equal to or greater than the upper limit of the traveling speed. The minimum traveling speed value Vmin is a value larger than zero. The administrator can input the input values of the traveling speeds between the maximum value Vmax and the minimum value Vmin. The lines Lma and Lmi may not be displayed on the display device 12.

Figure 7:
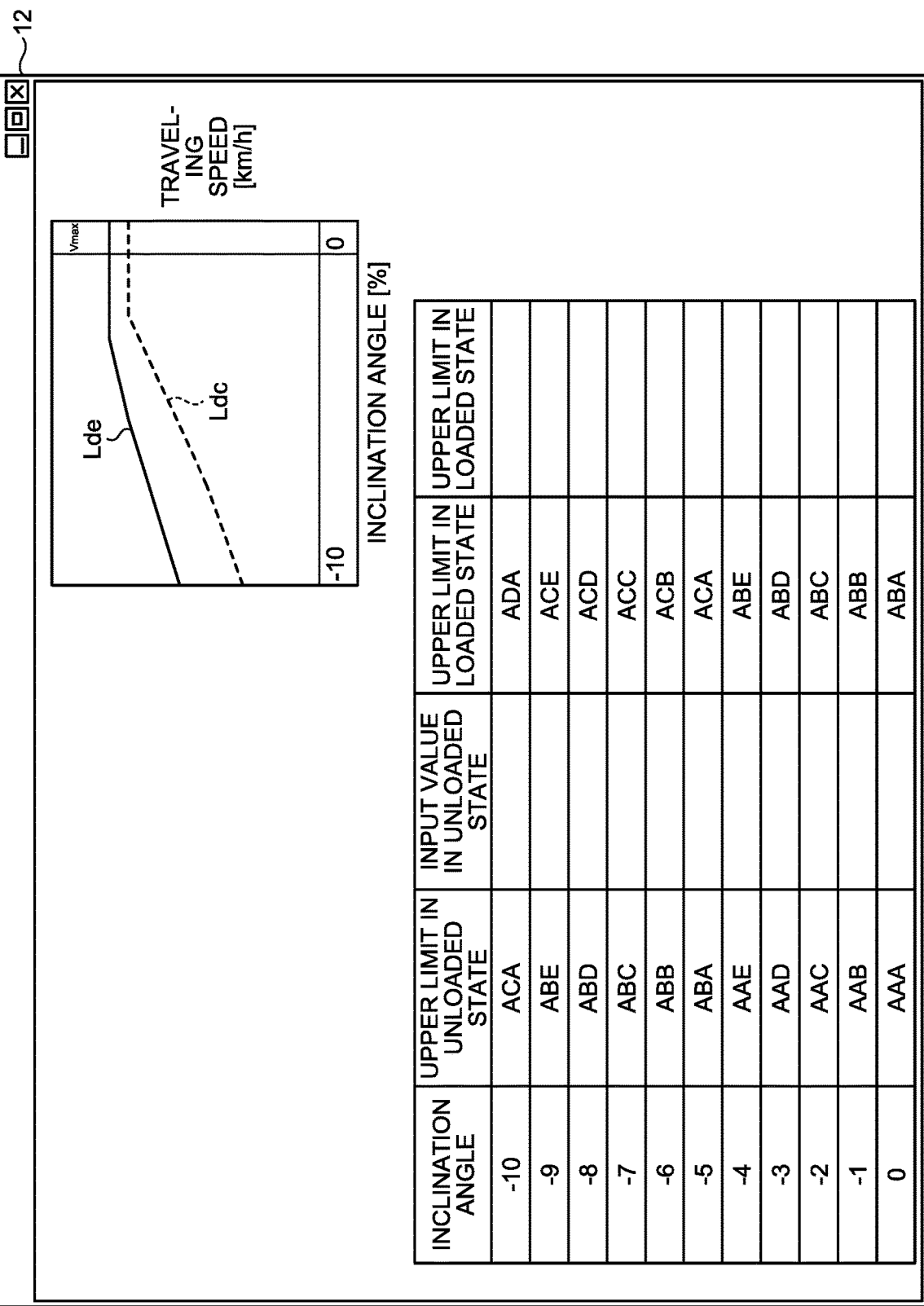
FIG. 7 is a view schematically illustrating an example of display data displayed on the display device according to the present embodiment.

FIG. 7 is a view schematically illustrating an example of the display data displayed on the display device 12 according to the present embodiment. The administrator operates the input device 11 to select the specific menu from among the menus displayed on the menu selection screen and thereby can cause the display device 12 to display the display data prompting the input of the traveling speeds as illustrated in FIG. 7.

As illustrated in FIG. 7, the display control unit 111 causes the display device 12 to display table data indicating relationships among the inclination angles of the downhill, the upper limit of the traveling speed in an unloaded state corresponding to each of the inclination angles, and the upper limit of the traveling speed in a loaded state corresponding to each of the inclination angles. In addition, the display control unit 111 causes the display device 12 to display, as the display data prompting the input of the traveling speeds, blanks for inputting the input value of the traveling speed corresponding to each of the inclination angles of the downhill.

The administrator operates the input device 11 to input the input value of the traveling speed in an unloaded state and the input value of the traveling speed in a loaded state for each of the inclination angles.

The input speed acquisition unit 102 acquires the input value of the traveling speed of the unmanned vehicle 2 on the downhill, input for each of the inclination angles by the input device 11 (Step S30).

The input values of the traveling speeds input by the input device 11 are stored in the input speed storage unit 102M. The input speed storage unit 102M stores the inclination angles of the downhill and the input values of the traveling speeds input for the inclination angles of the downhill in association with each other. When new input, values of the traveling speeds are input by the input device 11, the input values of the traveling speeds stored in the input speed storage unit 102M are updated to the new input values of the traveling speeds.

The input speed acquisition unit 102 determines whether the input of the input values of the traveling speeds has been completed (Step S40).

In Step S40, when it is determined that the input of the input values of the traveling speeds has not been completed (Step S40: No), the processing of Step S30 is executed.

In the present embodiment, an input value of a traveling speed is input for each of inclination angles of −10 [%], −9 [%], −3 [%], −7 [%], −6 [%], −5 [%], −4 [%], −3 [%], −2 [%], −1 %, and 0 [%]. The pieces of processing of Steps S30 and S40 are executed until the input of the input values of the traveling speeds is completed.

Figure 8:
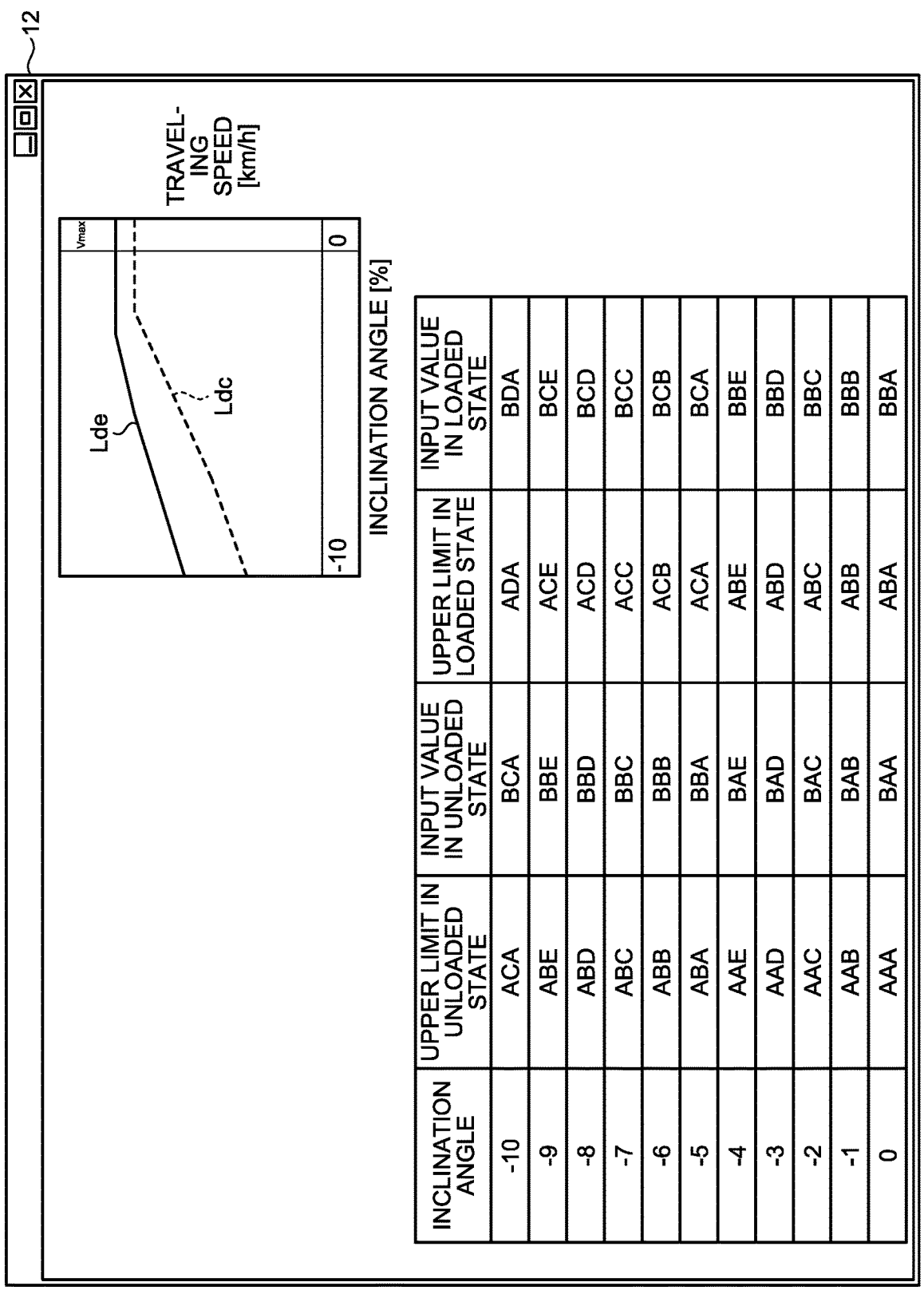
FIG. 8 is a view schematically illustrating an example of display data displayed on the display device according to the present embodiment.

FIG. 8 is a view schematically illustrating an example of the display data displayed on the display device 12 according to the present embodiment. As illustrated in FIG. 8, when the input of the input values of the traveling speeds is completed, the display control unit 111 causes the display device 12 to display table data based on the input values of the traveling speeds acquired by the input speed acquisition unit 102. The table data indicate relationships among the inclination angles on the downhill, the upper limit of the traveling speed in an unloaded state corresponding to each of the inclination angles, the upper limit of the traveling speed in a loaded state corresponding to each of the inclination angles, the input value of the traveling speed in an unloaded state corresponding to each of the inclination angles, and the input value of the traveling speed in a loaded state corresponding to each of the inclination angles.

In Step S40, when it is determined that, the input of the input values has been completed (Step S40: Yes), the rule determination unit 106 determines whether the input values of the traveling speeds violate the rules stored in the rule storage unit 105 (Step S70).

The rules include a first rule indicating that the input value of the traveling speed input for each of a plurality of inclination angles on the downhill is in descending order of decreasing as the inclination angle increases. Further, the rules include a second rule indicating that a difference between the input values of the traveling speeds input for each of adjacent inclination angles among the inclination angles specified at a constant interval is equal to or less than a threshold specified in advance. The rules include the third rule indicating that the input values of the traveling speeds are smaller than maximum values (see the line Lma in FIG. 6). In addition, the rules include the fourth rule indicating that the input values of the traveling speeds are larger than minimum values (see the line Lmi in FIG. 6).

Figure 9:
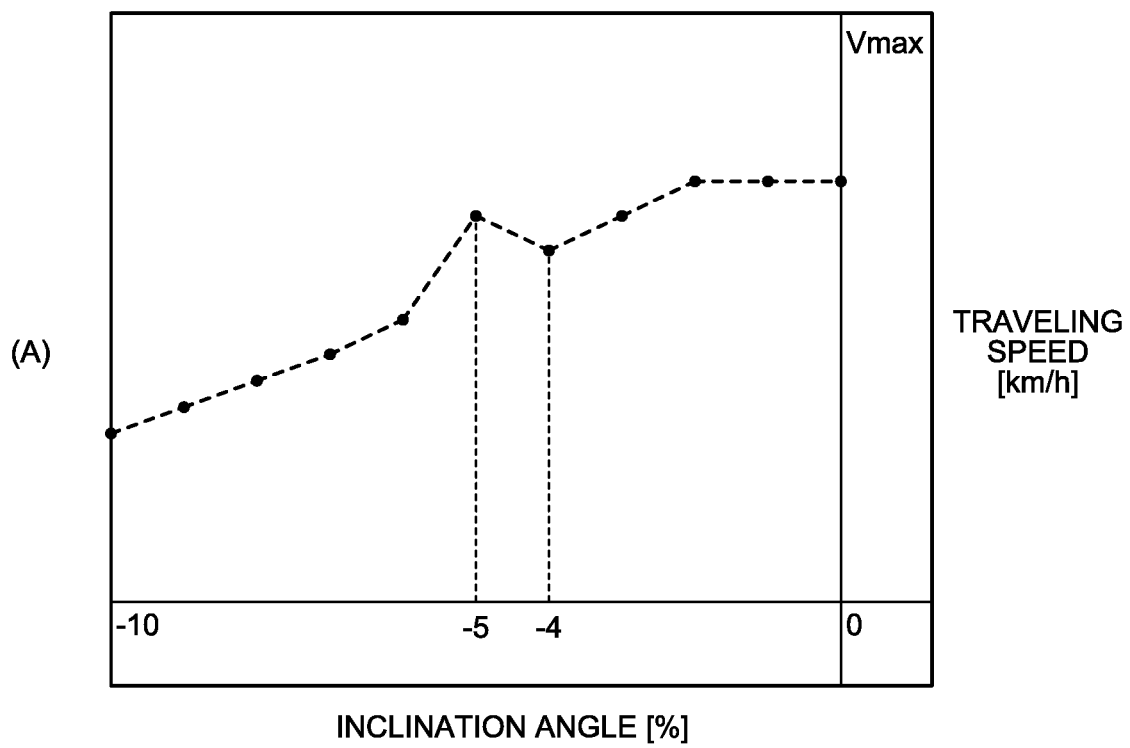
FIG. 9 is a view schematically illustrating an example of an input value that violates a rule according to the present embodiment.
Figure 9:
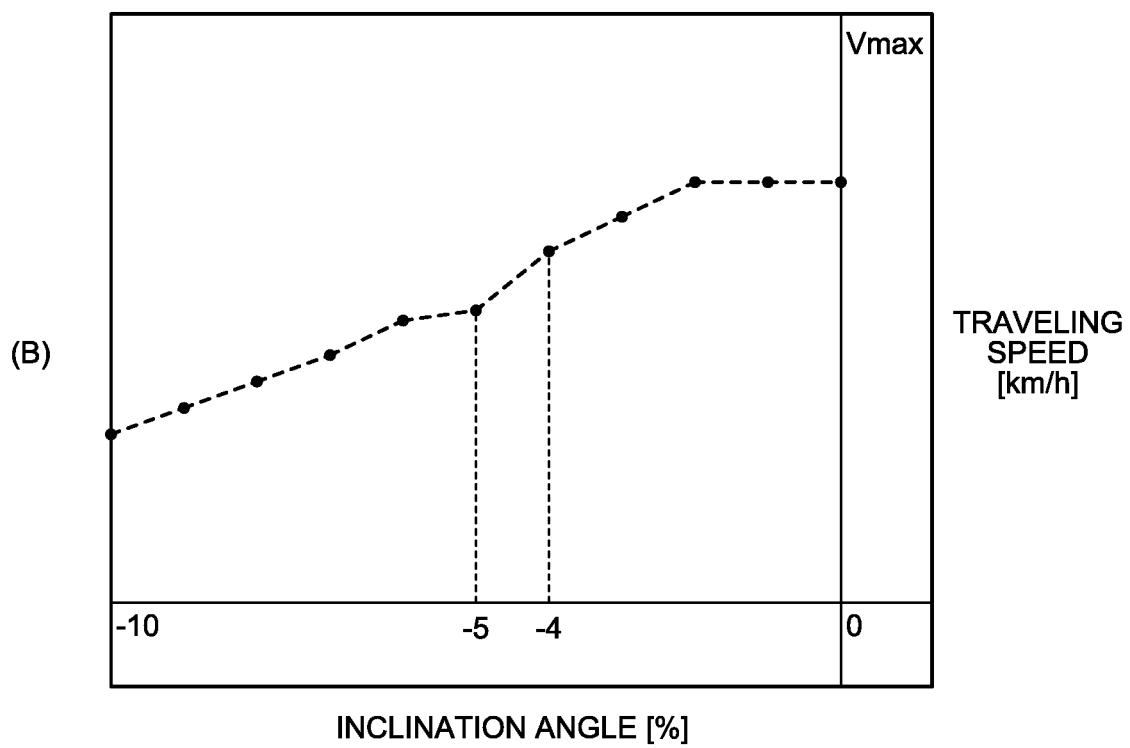

FIG. 9 is a view schematically illustrating example of the input values that violate the rules according to the present embodiment. It is preferred that the traveling speed of the unmanned vehicle 2 specified for the downhill gradually decreases as the inclination angle of the downhill increases. As illustrated in FIG. 9(A), for example, due to an input error by the administrator, when the input value of the traveling speed input for −5 [%] is larger than the input value of the traveling speed input for −4 [%], the rule determination unit 106 determines the first rule is violated. In addition, as illustrated in FIG. 9(B), although the input values of the traveling speeds are in descending order, when an input value of a traveling speed input for a certain inclination angle is extremely low to cause a difference with an input value of a traveling speed input for an adjacent inclination angle to be larger than a threshold, the rule determination unit 106 determines that the second rule is violated. FIG. 9(B) illustrates an example where the input value of the traveling speed input for −5 [%] is extremely low to cause a difference with the input value of the traveling speed input for next −4 [%] to be larger than a threshold.

The rule determination unit 106 determines whether the input values of the traveling speeds are in states as illustrated in FIG. 9, that is, whether the input values of the traveling speeds violate the rules stored in the rule storage unit 105.

In Step S70, when it is determined that the input values violate the rules (Step S70: Yes), the display control unit 111 causes the display device 12 to display warning data (Step S50).

Figure 10:
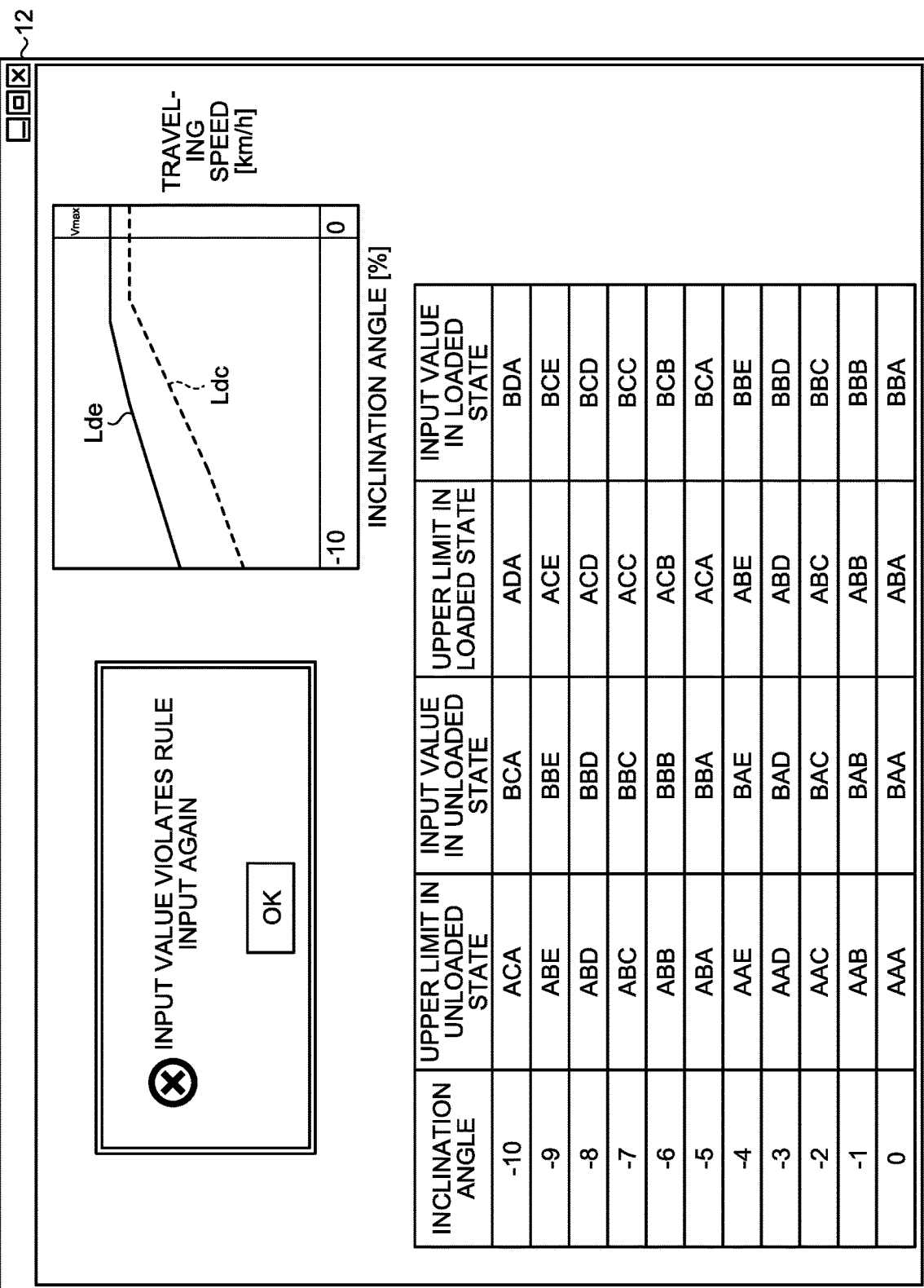
FIG. 10 is a view schematically illustrating an example of display data displayed on the display device according to the present embodiment.

FIG. 10 is a view schematically illustrating an example of the display data displayed on the display device 12 according to the present embodiment. As illustrated in FIG. 10, the display control unit 111 causes the display device 12 to display warning data indicating that the input values violate the rules. In the example illustrated in FIG. 10, character data are displayed as warning data. The warning data illustrated in FIG. 10 are an example. As warning data, voice data indicating that the input values violate the rules may be output.

When an input value of a traveling speed is a value between the upper limit and the maximum value, warning data may not be output.

The input speed acquisition unit 102 resets the input values determined that the input value violates the rules (Step S60). For example, in the examples illustrated in FIG. 9, since the input value of the traveling speed for the inclination angle of −5 [%] violates the rules, the input speed acquisition unit 102 resets the input value input for the inclination angle of −5 [%]. After the input value is reset, the processing of Step S30 is executed. The administrator re-inputs the input value of the traveling speed for the reset inclination angle.

The processing of Step S60 may be omitted. More specifically, when the input values of the traveling speeds violate the rules, warning data may be only output without resetting the input values.

The pieces of processing of Steps S30 to S70 are executed until the input values of the traveling speeds do not violate the rules.

In Step S70, when it is determined that the input values do not violate the rules (Step S70: No), the display control unit 111 causes the display device 12 to display side by side the upper limit speed data indicating the relationship between the inclination angle and the upper limit of the traveling speed and the input speed data indicating the relationship between the inclination angle and the input, value of the traveling speed (Step S80).

Figure 11:
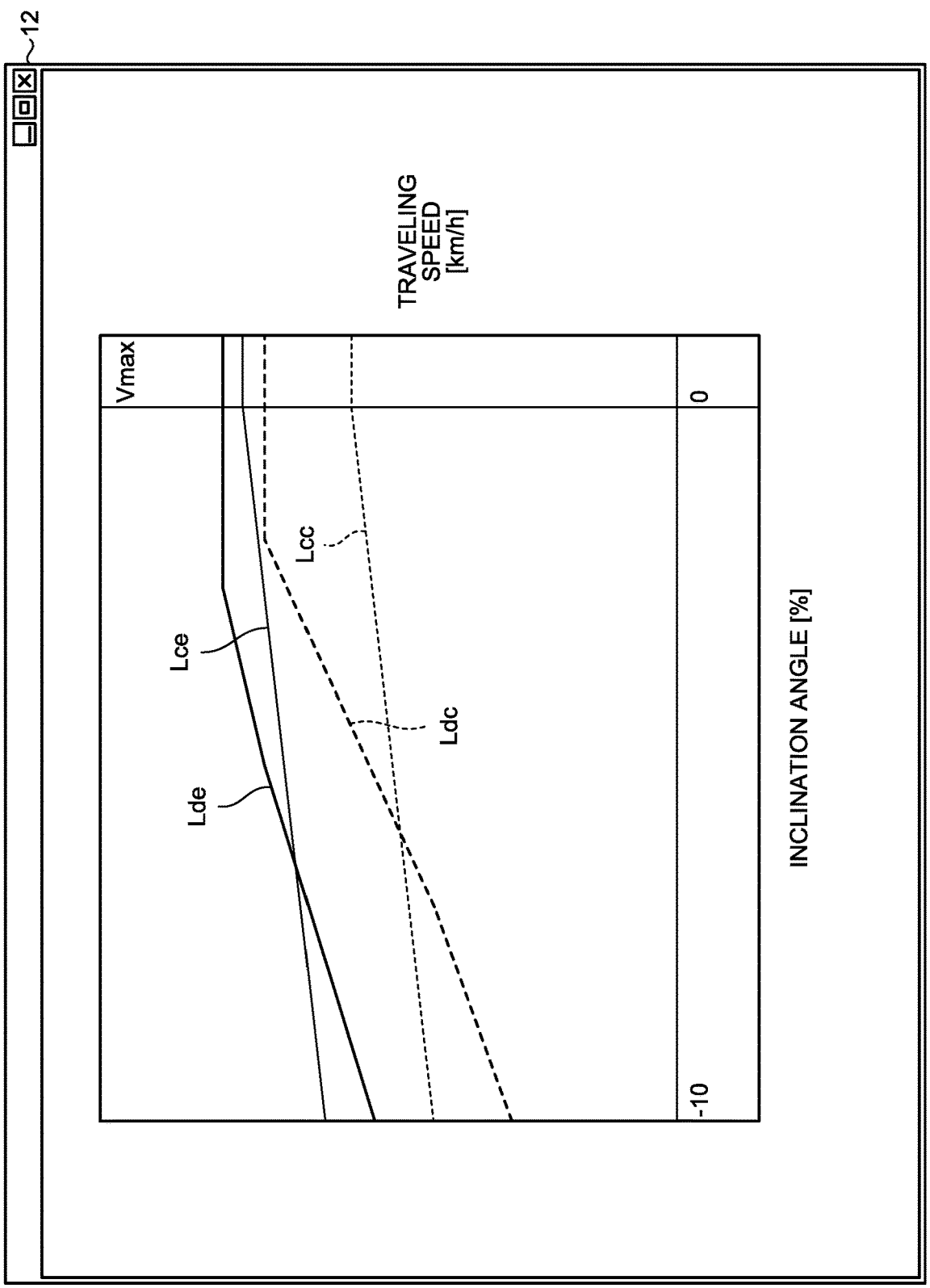
FIG. 11 is a view schematically illustrating an example of display data displayed on the display device according to the present embodiment.

FIG. 11 is a view schematically illustrating an example of the display data displayed on the display device 12 according to the present embodiment. As illustrated in FIG. 11, the display control unit 111 causes the display device 12 to display two types of input speed data indicating the relationship between the inclination angle of the downhill and the input value of the traveling speed. In FIG. 11, a line Lee indicates the input speed data in an unloaded state, and a line Lcc indicates the input, speed data in a loaded state. In descriptions below, the input speed data in an unloaded state are appropriately referred to as empty input speed data Lce, and the input speed data in a loaded state are appropriately referred to as cargo input speed data Lcc. Further, when the empty input speed data Lce and the cargo input speed data Lee are not distinguished, the empty input speed data Lce and the cargo input speed data Lee are collectively referred to as input speed data Lc as appropriate.

As illustrated in FIG. 11, the display control unit 111 causes the display device 12 to display, side by side in one graph, the empty upper limit speed data Lde, the empty input speed data Lce, the cargo upper limit speed data Ldc, and the cargo input speed data Lcc.

In the display device 12, since the upper limit speed data Ld and the input speed data Lc are displayed side by side with the display device 12, the administrator can intuitively recognize, at a sight of the display device 12, a relative relationship between the upper limit speed data Ld and the input speed data Lc.

After the upper limit speed data Ld and the input speed data Lc are displayed on the display device 12, the display control unit 111 causes the display device 12 to display the display data prompting re-input of a traveling speed. As the display data prompting the re-input of a traveling speed, character data are displayed on the display device 12.

When determining the re-input at a sight of the display data prompting the re-input of a traveling speed, the administrator operates the input device 11 to input command data indicating the re-input. On the other hand, when determining not to perform the re-input, the administrator operates the input device 11 to input command data indicating that the re-input is not performed.

After all input values have been input, the display data prompting the re-input of a traveling speed may be displayed on the display device 12.

The input speed acquisition unit 102 determines, based on the command data, whether to reacquire the input value of the traveling speed (Step S90).

In Step S90, when the command data indicating the re-input are input and it is determined to reacquire an input value of a traveling speed (Step S90: Yes), the display control unit 111 causes the display device 12 to display the display data prompting the input of the traveling speed. The administrator operates the input device 11 to re-input the traveling speed of the unmanned vehicle 2 on the downhill.

The input speed acquisition unit 102 acquires the input value of the traveling speed of the unmanned vehicle 2 on the downhill, re-input by the input device 11 (Step S30).

The management device 10 executes the pieces of processing of Steps S30 to S90 until it is determined in Step S90 not to reacquire an input value.

In Step S90, when the command data indicating that re-input is not performed are input and it is determined that an input value of a traveling speed is not acquired again (Step S90: No), the target speed determination unit 107 determines, based on the upper limit speed data and the input speed data, the target value of the traveling speed of the unmanned vehicle 2 on the downhill (Step S100).

The processing in Step S90 may be omitted.

The upper limit determination unit 104 determines, at each of the inclination angles, whether the input value of the traveling speed is equal to or less than the upper limit of the traveling speed. Based, on the upper limit of the traveling speed and the input value of the traveling speed determined as equal to or less than the upper limit by the upper limit determination unit 104, the target speed determination unit 107 determines a target value of the traveling speed of the unmanned vehicle 2 on the downhill. In other words, the target speed determination unit 107 compares, at each of the inclination angles, the upper limit of the traveling speed, with the input value of the traveling speed to determine the smaller value of the upper limit, and the input value as the target value of the traveling speed at the inclination angle.

The display control unit 111 causes the display device 12 to display the target speed data indicating the relationship between the inclination angle of the downhill and the target value of the traveling speed (Step S110).

FIG. 12 is a view schematically illustrating an example of the display data displayed on the display device 12 according to the present embodiment. As illustrated in FIG. 12, the display control unit 111 causes the display device 12 to display two types of target speed data indicating the relationship between the inclination angle of the downhill and the target value of the traveling speed. In FIG. 12, a line Lre indicates the target speed data in an unloaded state, and a line Lrc indicates the target speed data in a loaded state. In descriptions below, the target speed data in an unloaded state are appropriately referred to as empty input speed data Lre, and the target speed data in a loaded state are appropriately referred to as cargo target speed data Lrc. Further, when the empty target speed data Lre and the cargo target speed data Lrc are not distinguished, the empty target speed data Lre and the cargo target speed data Lrc are collectively referred to as target speed data Lr as appropriate.

The display control unit 111 may cause the display device 12 to display a line indicating the empty upper limit speed data Lde, a line indicating the cargo upper limit speed data Ldc, a line indicating the empty input speed data Lce, a line indicating the cargo input speed data Lcc, a line indicating the empty target speed data Lre, and a line indicating the cargo target speed data Lrc in different display forms (e.g., line type and color). This makes it easier for the administrator to distinguish among the lines.

As illustrated in FIG. 12, in a range of inclination angles where the empty input speed data Lce are larger than the empty upper limit speed data Lde, the empty target speed data Lre are specified by the empty upper limit speed data Lde. In a range of inclination angles where the empty input speed data Lce are equal to or less than the empty upper limit speed data Lde, the empty target speed data Lre are specified by the empty input speed data Lce. Similarly, in a range of inclination angles where the cargo input speed data Lee are larger than the cargo upper limit speed data Ldc, the cargo target speed data Lrc are specified by the cargo upper limit speed data Ldc. In a range of inclination angles where the cargo input speed data Lcc are equal to or less than the cargo upper limit speed data Ldc, the cargo target speed data Lrc are specified by the cargo input speed data Lcc.

In other words, in a range of inclination angles where the input speed data Lc are larger than the upper limit speed data Ld, the target speed data Lr are specified by the upper limit speed data Ld. In a range of inclination angles where the input speed data Lc are equal to or less than the upper limit speed data Ld, the target speed data Lr are specified by the input speed data Lc. Thus, in a range of inclination angles where the input values of the traveling speeds do not exceed the upper limits of the traveling speeds, the target values of the traveling speeds are specified by the input values of the traveling speeds.

The traveling condition generation unit 108 generates the traveling condition data based on the target speed data determined by the target speed determination unit 107. The communication unit 109 transmits the traveling condition data including the target speed data to the control device 40 of the unmanned vehicle 2 (Step S120).

In the present embodiment, as described with reference to FIGS. 7 and 8, it is assumed that an input value of a traveling speed is input for each of the inclination angles from −10 [%] to 0 [%]. The traveling speed may be input for some of the inclination angles from −10 [%] to 0 [%]. In addition, the inclination angles from −10 [%] to 0 [%] are examples, and the input value of the traveling speed may be input for arbitrary inclination angles.

Figure 13:
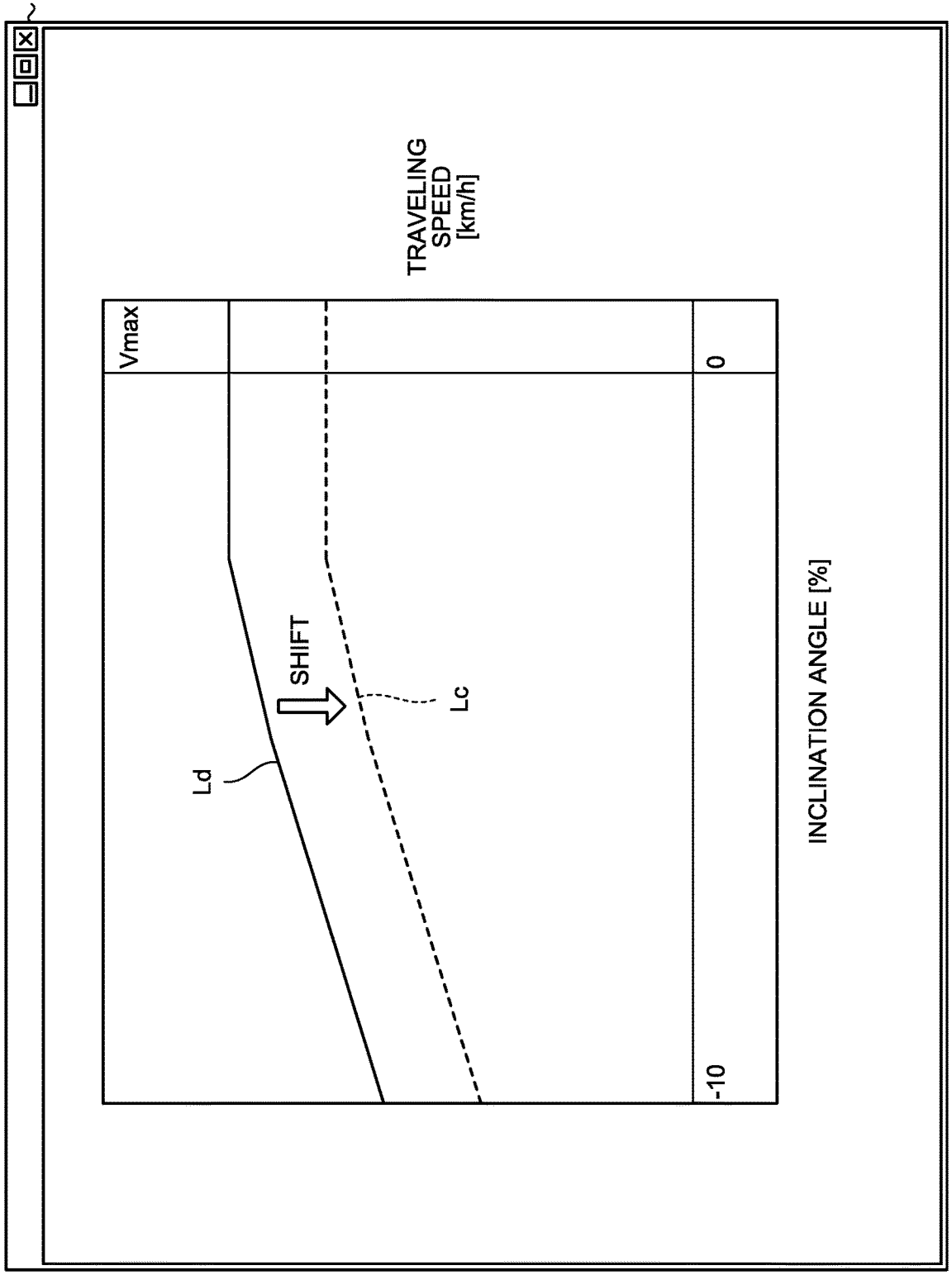
FIG. 13 is a view schematically illustrating an example of input speed data according to the present embodiment.

Further, a shift amount from the upper limit may be input as the input value. FIG. 13 is a view schematically illustrating an example of the input speed data Lc according to the present embodiment. As illustrated in FIG. 13, when the upper limit speed data Ld indicating the relationship between the inclination angle of the downhill and the upper limit of the traveling speed are set, the administrator operates the input device 11 to input, as the input value, the shift amount from the upper limit. The shift amount is a value that reduces the upper limit. The input speed acquisition unit 102 acquires the shift amount and reduces, based on the acquired shift amount, the upper limit of the traveling speed for each inclination angle. More specifically, the input speed acquisition unit 102 may shift (translate), based on the shift amount or the input value, the upper limit speed data Ld illustrated in FIG. 13 downward to generate the input speed data Lc indicating the relationship between the inclination angle of the downhill and the input value of the traveling speed.

Control Methods

Figure 14:
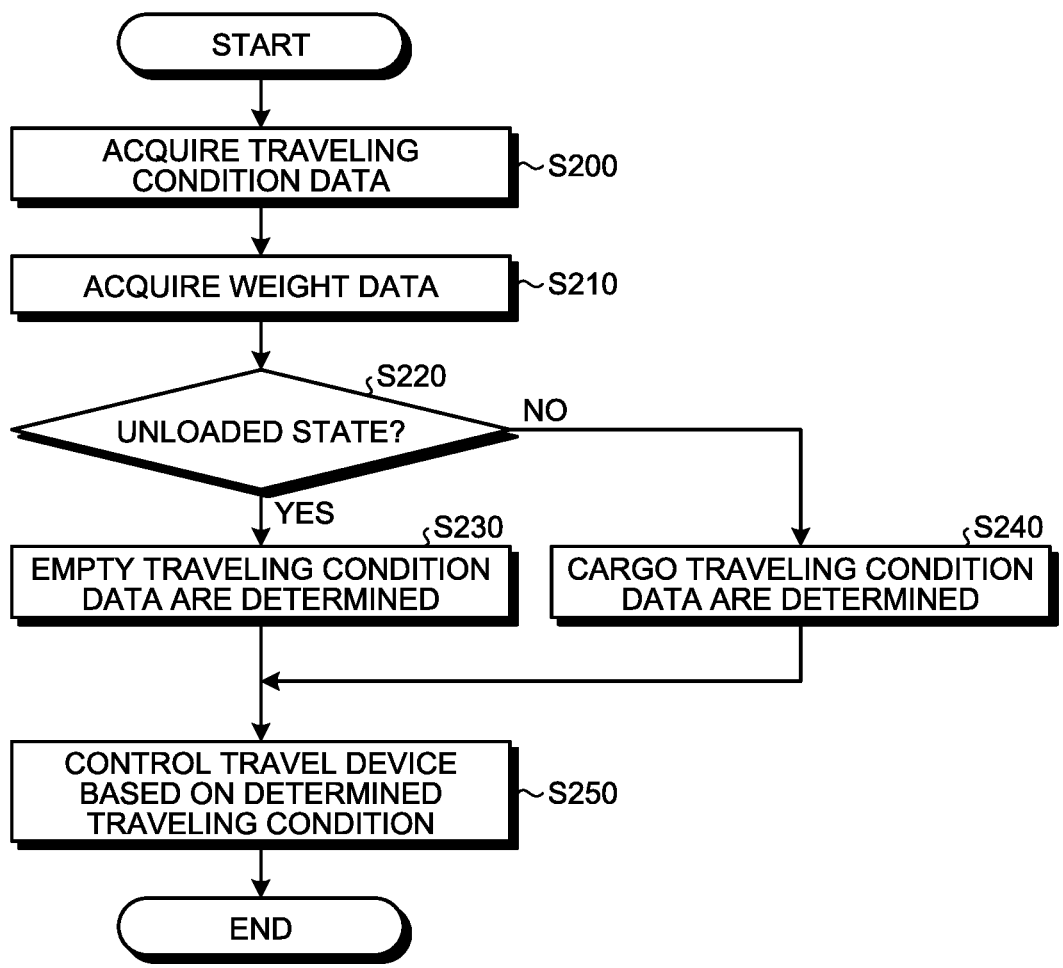
FIG. 14 is a flowchart illustrating a control method by the control device according to the present embodiment.

FIG. 14 is a flowchart illustrating an example of a control method by the control device 40 according to the present embodiment.

The traveling condition acquisition unit 42 acquires the traveling condition data transmitted from the management device 10 via the communication unit 41 (Step S200).

The management device 10 transmits two types of traveling condition data to the control device 40. The traveling condition data transmitted from the management device 10 to the control device 40 include empty traveling condition data including the empty target speed data Lre and cargo traveling condition data including the cargo target speed data Lrc.

The weight data acquisition unit 43 acquires the weight data from the weight sensor 29 (Step S210).

The cargo determination unit 44 determines, based on the weight data acquired by the weight data acquisition unit 43, whether the unmanned vehicle 2 is in an unloaded state (Step S220).

In Step S220, when it is determined that the unmanned vehicle 2 is in an unloaded state (Step S220: Yes), the traveling condition determination unit 45 determines, of the two types of traveling condition data, the empty traveling condition data including the empty target speed data Lre as the traveling condition data (Step S230).

In Step S220, when it is determined that the unmanned vehicle 2 is in a loaded state (Step S220: No), the traveling condition determination unit 45 determines, of the two types of traveling condition data, the cargo traveling condition data including the cargo target speed data Lrc as the traveling condition data (Step S240).

Based on the traveling condition data (target speed data) determined by the traveling condition determination unit 45, the travel, control unit 46 controls the travel device 23 (Step S250).

The travel control unit 46 collates the detection data of the position detection device 30 with the traveling condition data and controls the travel device 23 to travel according to the target speed data on the downhill of the traveling path. When the unmanned vehicle 2 is in an unloaded state, the travel control unit 46 controls the travel device 23 based on the empty traveling condition data. When the unmanned vehicle 2 is in a loaded state, the travel control unit 46 controls the travel device 23 based on the cargo traveling condition data.

Effects

As described above, according to the present embodiment, the administrator of the control facility 5 can operate the input device 11 to arbitrarily set the traveling speed of the unmanned vehicle 2 on the downhill. As a result, the administrator can flexibly adjust the target traveling speed of the unmanned vehicle 2 based on the traveling path conditions at the work site. For example, when the traveling path is muddy due to rainwater, the administrator can operate the input device 11 to suppress the traveling speed of the unmanned vehicle 2 to a low value. When the traveling path conditions are good, the administrator can operate the input device 11 to adjust the traveling speed of the unmanned vehicle 2 to a high value within a range not exceeding the maximum value or the upper limit. Even if the traveling path conditions vary depending on, for example, work sites or change over time, the target traveling speed of the unmanned vehicle 2 can be flexibly adjusted based on the traveling path conditions at the work site.

In addition, according to the present embodiment, the target traveling speed of the unmanned vehicle 2 can be set for each of a plurality of unmanned vehicles 2.

In the present embodiment, as illustrated in FIG. 11, the upper limit speed data specified in advance and the input speed data input by operating the input device 11 are displayed side by side on the display device 12. Since the upper limit speed data Ld and the input speed data Lc are displayed side by side with the display device 12, the administrator, can input an input value of a traveling speed while intuitively recognizing, at the sight of the display device 12, the relative relationship between the upper limit speed data Ld and the input speed data Lc. Thus, appropriate input speed data Lc are generated.

Furthermore, the management device 10 includes the upper limit determination unit 104 that determines whether an input, value is equal to or less than an upper limit and the target speed determination unit 107 that determines, based on the upper limit and the input value determined as equal to or less than the upper limit by the upper limit determination unit 104, the target value of the traveling speed of the unmanned vehicle 2 on the downhill. In other words, in a range of inclination angles where the input speed data Lc are larger than the upper limit speed data Ld, the target speed data Lr are specified by the upper limit speed data Ld. In a range of inclination angles where the input speed data Lc are equal to or less than the upper limit speed data Ld, the target speed data Lr are specified by the input speed data Lc. Since the target value of the traveling speed is suppressed at a value equal to or less than the upper limit, the unmanned vehicle 2 is suppressed from traveling at an excessively high speed.

In addition, as illustrated in FIG. 12, the upper limit speed data Ld, the input speed data Lc, and the target speed data Lr are displayed side by side on the display device 12. Thus, at the sight of the display device 12, the administrator can intuitively recognize the relative relationship among the upper limit speed data Ld, the input speed data Lc, and the target speed data Lr.

Further, when rules are specified for the input values and it is determined that the input values violate the rules, warning data are, as illustrated in FIG. 10, displayed on the display device 12. When the target speed data are set based on the input values violating the rules, the unmanned vehicle 2 may travel at an excessively high speed on the downhill with a certain inclination angle or may unnecessarily accelerate or decelerate. When it is determined whether the input values do not violate the rules and it is determined that the input values violate the rules, warning data are displayed on the display device 12, so that the administrator can re-input appropriate input values.

Furthermore, the management device 10 includes the authentication unit 101. This allows only a specific administrator permitted to input the input values to adjust the traveling speed of the unmanned vehicle 2.

Computer Systems

Figure 15:
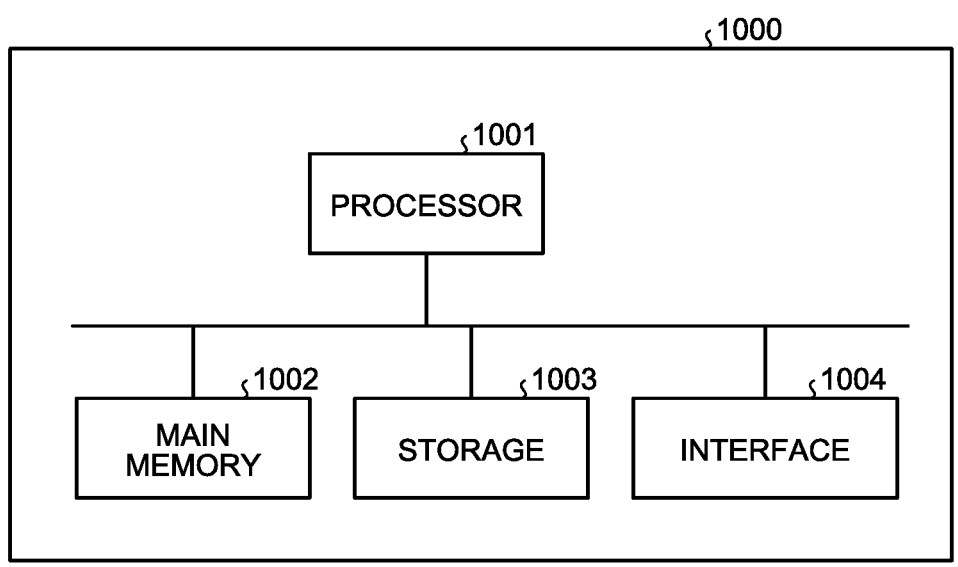
FIG. 15 is a block diagram illustrating an example of a computer system.

FIG. 15 is a block diagram illustrating an example of a computer system 1000. The management device 10 and the control device 40 described above each include the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. Functions of the management device 10 and the control device 40 described above are stored in the storage 1003 as programs. The processor 1001 reads the programs from the storage 1003 to be expanded in the main memory 1002 and executes the processing described above according to the program. The programs may be distributed to the computer system 1000 via a network.

In the embodiment described above, at least a part of the functions of the control device 40 of the unmanned vehicle 2 may be provided in the management device 10, or at least a part of the functions of the management device 10 may be provided in the control device 40.

For example, in the embodiment described above, it is assumed that the management device 10 generates the traveling condition data including the target speed data Lr (Lre and Lrc) to be transmitted to the control device 40. The upper limit speed data Ld (Lde and Ldc) and the input speed data Lc (Lce and Lcc) may be transmitted from the management device 10 to the control device 40, and the control device 40 may calculate the target speed data (Lre and Lrc).

The computer system 1000 including at least the management device 10 and/or the control device 40 can cause the display device 12 to display the upper limit speed data and the input speed data. The upper limit speed data indicate the relationship between the inclination angle of the downhill and the upper limit of the traveling speed of the unmanned vehicle 2 on the downhill set based on the inclination angle. The input speed data indicate the relationship between the inclination angle and the input value of the traveling speed of the unmanned vehicle 2 on the downhill input for the inclination angle by the input device 11.

Other Embodiments

In the embodiment described above, as illustrated in FIG. 12, it is assumed that, the target speed data Lr (Lre and Lrc) are displayed on the display device 12. The target speed data Lr may not be displayed on the display device 12.

In the embodiment described above, the travel control unit 46 of the control device 40 may control, based on the upper limit speed data and the input speed data, the travel device 23 of the unmanned vehicle 2. For example, the upper limits stored in the upper limit speed storage unit 103 of the management device 10 and the input values input to the management device 10 by the input device 11 are transmitted to the control device 40 of the unmanned vehicle 2 via the communication system 4. Based on the upper limits and the input values transmitted from the management device 10, the control device 40 can generate the traveling condition data. The traveling condition data include the upper limit speed data and the input speed data. The upper limit speed data indicate the relationship between the inclination angle of the downhill and the upper limit of the traveling speed. The input speed data indicate the relationship between the inclination angle of the downhill and the input value of the traveling speed. Based on the generated traveling condition data, the travel control unit 46 can control the travel device 23. In this case, the upper limit speed data and the input speed data may not be displayed on the display device 12. Since the target traveling speed of the unmanned vehicle 2 is flexibly adjusted, even if the traveling path conditions vary depending on work sites or change over time, the unmanned vehicle 2 can travel at an appropriate traveling speed based on the traveling path conditions at the work site.

In the embodiment described above, it is assumed that based on the inclination angle of the downhill, the upper limit of the traveling speed is set, the input value of the traveling speed is input, or the target value of the traveling speed is set. Based on an inclination angle of an uphill, the upper limit of the traveling speed may be set, the input value of the traveling speed may be input, or the target value of the traveling speed may be set.

In the embodiment described above, an output device that outputs the upper limit speed data and the input speed data as display data is assumed to be the display device 12. The output device may be a printing device, for example. The printing device can output the upper limit speed data and the input speed data as print data.

In the embodiment described above, the unmanned vehicle 2 is assumed to be a dump truck, or a kind of transport vehicle. The unmanned vehicle 2 may be a working machine including working equipment such as an excavator or a bulldozer.

REFERENCE SIGNS LIST

1 Management system
2 Unmanned vehicle
4 Communication system
5 Control facility
6 Wireless communication device
10 Management device
11 Input device
12 Display device (output device)
13 Authentication device
21 Vehicle main body
22 Dump body
23 Travel device
23A Drive device
23B Brake device
23C Steering device
27 Wheel
27F Front wheel
27R Rear wheel
23 Suspension cylinder
29 Weight sensor
30 Position detection device
31 Wireless communication device
40 Control device
41 Communication unit
42 Traveling condition acquisition unit
43 Weight data acquisition unit
44 Cargo determination unit
45 Traveling condition determination unit
46 Travel control unit
101 Authentication unit
102 Input speed acquisition unit
102M Input speed storage unit
103 Upper limit speed storage unit
104 Upper limit determination unit
105 Rule storage unit
106 Rule determination unit
107 Target speed determination unit
108 Traveling condition generation unit
109 Communication unit
110 Display data generation unit
111 Display control unit (output control unit)
Lc Input speed data
Lce Empty input speed data
Lcc Cargo input speed data
Ld Upper limit speed data
Lde Empty upper limit speed data
Ldc Cargo upper limit speed data
Lma Line
Lmi Line
Lr Target speed data
Lre Empty target speed data
Lrc Cargo target speed data
PI Point

The invention claimed is:

1. An unmanned vehicle management device comprising:
an upper limit speed storage unit that stores an upper limit of a traveling speed of an unmanned vehicle, traveling unmanned, on a downhill, set based on an inclination angle of the downhill;
an input speed acquisition unit that acquires an input value input by an administrator by an input device;
an output control unit that causes an output device to output upper limit speed data indicating a relationship between the inclination angle and the upper limit and input speed data generated based on the input value;
a rule storage unit that stores a rule specified for the input value; and
a rule determination unit that determines whether the input value violates the rule;
wherein the output control unit causes the output device to output warning data, at the time of inputting the input value, when it is determined that the input value violates the rule by the rule determination unit, and
wherein when it is determined that the input value violates the rule, warning data are output, prompting the administrator to re-input the input value, which does not violate the rule.

2. The unmanned vehicle management device according to claim 1, wherein
the input value includes an input value of the traveling speed of the unmanned vehicle on the downhill, input for the inclination angle, and
the output control unit causes the output device to output the input speed data indicating a relationship between the inclination angle and the input value.

3. The unmanned vehicle management device according to claim 2, comprising:
an upper limit determination unit that determines whether the input value is equal to or less than the upper limit; and
a target speed determination unit that determines, based on the upper limit and the input value determined as equal to or less than the upper limit by the upper limit determination unit, a target value of the traveling speed of the unmanned vehicle on the downhill.

4. The unmanned vehicle management device according to claim 3, wherein
the target speed determination unit compares the upper limit with the input value to determine the smaller value of the upper limit and the input value as the target value at the inclination angle.

5. An unmanned vehicle management method comprising:
inputting a speed value on an input device operated by an administrator;
causing an output device to output upper limit speed data indicating a relationship between an inclination angle of a downhill and an upper limit of a traveling speed of an unmanned vehicle, traveling unmanned, on the downhill set based on the inclination angle, and input speed data generated based on the input value input by the input device;
storing a rule specified for the input value;
determining whether the input value violates the rule; and
outputting warning data, at the time of inputting the input value, when it is determined that the input value violates the rule, and
wherein when it is determined that the input value violates the rule, warning data are output, prompting the administrator to re-input the input value, which does not violate the rule.

6. An unmanned vehicle management system comprising:
an upper limit speed storage unit that stores an upper limit of a traveling speed of an unmanned vehicle, traveling unmanned, on a downhill, set based on an inclination angle of the downhill;
an input speed acquisition unit that acquires an input value input by an administrator by an input device;
a travel control unit that controls a travel device of the unmanned vehicle based on upper limit speed data indicating a relationship between the inclination angle and the upper limit, and input speed data generated based on the input value;
a rule storage unit that stores a rule specified for the input value; and
a rule determination unit that determines whether the input value violates the rule;
wherein the output control unit causes the output device to output warning data, at the time of inputting the input value, when it is determined that the input value violates the rule by the rule determination unit, and
wherein when it is determined that the input value violates the rule, warning data are output, prompting the administrator to re-input the input value, which does not violate the rule.

\* \* \* \* \*